(12) United States Patent
Baharav et al.

(10) Patent No.: US 7,164,782 B2
(45) Date of Patent: Jan. 16, 2007

(54) SYSTEM AND METHOD FOR TIME-SPACE MULTIPLEXING IN FINGER-IMAGING APPLICATIONS

(75) Inventors: Izhak Baharav, San Jose, CA (US); Akihiro Machida, Cupertino, CA (US); George E. Smith, Cupertino, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 837 days.

(21) Appl. No.: 10/418,981

(22) Filed: Apr. 18, 2003

(65) Prior Publication Data
US 2004/0208347 A1 Oct. 21, 2004

(51) Int. Cl.
G06K 7/00 (2006.01)
G06K 9/00 (2006.01)
G06K 9/20 (2006.01)

(52) U.S. Cl. ...................................... 382/124; 382/312
(58) Field of Classification Search ........ 382/124–127, 382/312
See application file for complete search history.

(56) References Cited

U.S. PATENT DOCUMENTS

| | | | |
|---|---|---|---|
| 4,311,383 A | 1/1982 | Ohtsubo | 356/28.5 |
| 4,521,772 A | 6/1985 | Lyon | 340/710 |
| 4,631,400 A | 12/1986 | Tanner et al. | 250/221 |
| D288,930 S | 3/1987 | Barbera et al. | D14/114 |
| 4,751,505 A | 6/1988 | Williams et al. | 340/710 |
| 4,794,384 A | 12/1988 | Jackson | 340/710 |
| 4,799,049 A | 1/1989 | Avila | 340/709 |
| 4,804,949 A | 2/1989 | Faulkerson | 340/710 |
| 4,978,860 A | 12/1990 | Bayley et al. | 250/568 |
| D314,194 S | 1/1991 | Norris | D14/114 |
| 5,089,712 A | 2/1992 | Holland | 250/557 |
| 5,149,980 A | 9/1992 | Ertel et al. | 250/561 |
| 5,355,146 A | 10/1994 | Chiu et al. | 345/156 |
| 5,578,813 A | 11/1996 | Allen et al. | 250/208.1 |
| 5,644,139 A | 7/1997 | Allen et al. | 250/557 |
| 5,701,187 A | 12/1997 | Uchio et al. | 359/143 |
| 5,729,008 A | 3/1998 | Blalock et al. | 250/208.1 |
| 5,769,384 A | 6/1998 | Baumgartner et al. | 250/214 |
| 5,786,804 A | 7/1998 | Gordon | 345/158 |

(Continued)

FOREIGN PATENT DOCUMENTS

EP 905646 A1 * 3/1999

(Continued)

OTHER PUBLICATIONS

Arun Ross, James Reisman and Anil Jain; *Fingerprint Matching Using Feature Space Correlation.*

(Continued)

Primary Examiner—Jingge Wu
Assistant Examiner—Yubin Hung

(57) ABSTRACT

An apparatus for imaging a fingerprint operates in a selected mode to provide a finger recognition and/or a finger navigation application. Multiple light sources are capable of being sequentially selected for illumination of corresponding partitions of a finger interface upon which a user places a finger (or thumb). The selection of light sources is based on the selected mode of operation. A single sensor captures light reflected from the digit in all illuminated partitions as sequential partition images. The sensor further outputs image data corresponding to the captured partition images for processing in the selected mode.

18 Claims, 14 Drawing Sheets

U.S. PATENT DOCUMENTS

| | | | |
|---|---|---|---|
| 5,825,044 A | 10/1998 | Allen et al. | 250/557 |
| 5,909,209 A | 6/1999 | Dickinson | 345/163 |
| 5,933,515 A * | 8/1999 | Pu et al. | 382/124 |
| 5,994,710 A | 11/1999 | Knee et al. | 250/557 |
| 6,002,124 A | 12/1999 | Bohn et al. | 250/208.1 |
| 6,047,091 A | 4/2000 | Anderson | 382/260 |
| 6,049,338 A | 4/2000 | Anderson et al. | 345/430 |
| 6,049,621 A | 4/2000 | Jain et al. | 382/125 |
| 6,057,540 A * | 5/2000 | Gordon et al. | 250/221 |
| 6,104,020 A | 8/2000 | Knee et al. | 250/208.1 |
| 6,151,015 A | 11/2000 | Badyal et al. | 345/179 |
| 6,172,354 B1 | 1/2001 | Adan et al. | 250/221 |
| 6,185,318 B1 | 2/2001 | Jain et al. | 382/125 |
| 6,195,475 B1 | 2/2001 | Beausoleil, Jr. et al. | 382/312 |
| 6,233,368 B1 | 5/2001 | Badyal et al. | 382/307 |
| 6,249,360 B1 | 6/2001 | Pollard et al. | 358/473 |
| 6,263,091 B1 | 7/2001 | Jain et al. | 380/125 |
| 6,265,706 B1 | 7/2001 | Oliver et al. | 250/208.1 |
| 6,281,882 B1 | 8/2001 | Gordon et al. | 345/166 |
| 6,289,112 B1 | 9/2001 | Jain et al. | 382/116 |
| 6,303,921 B1 | 10/2001 | Hastings et al. | 250/208.1 |
| 6,314,197 B1 | 11/2001 | Jain et al. | 382/125 |
| 6,898,301 B1 * | 5/2005 | Iwanaga | 382/124 |
| 7,064,743 B1 * | 6/2006 | Nishikawa | 345/157 |
| 2004/0125993 A1 * | 7/2004 | Zhao et al. | 382/124 |
| 2005/0078855 A1 * | 4/2005 | Chandler et al. | 382/116 |

FOREIGN PATENT DOCUMENTS

| | | |
|---|---|---|
| EP | 1 179 801 | 3/2001 |

OTHER PUBLICATIONS

Anil Jain, Arun Ross and Salil Prabhakar; *Fingerprint Matching Using Minutiae and Texture Features*.

Lin Hong; *Automatic Personal Identification Using Fingerprints*; A Dissertation submitted to Michigan State University, Department of Computer Science; Jun. 25, 1998; pp. 1-227.

Search Report Under Section 17 dated Jun. 10, 2004.

* cited by examiner

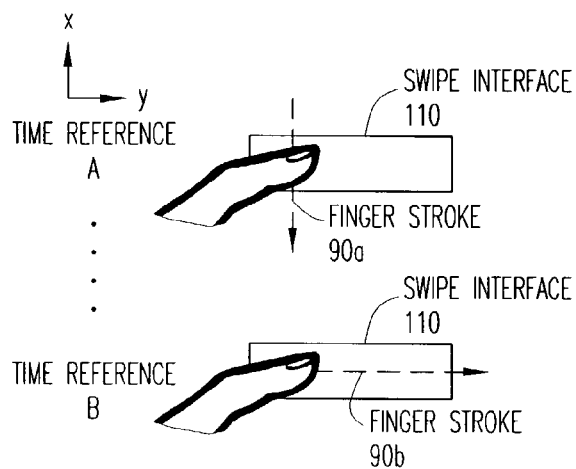
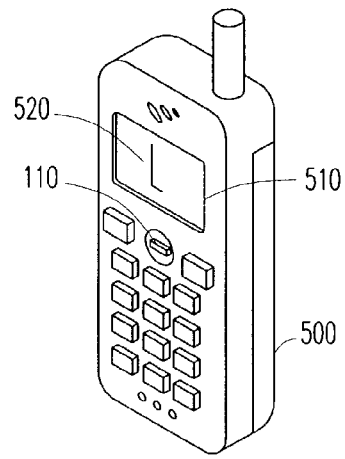
FIG. 16A
FIG. 16B
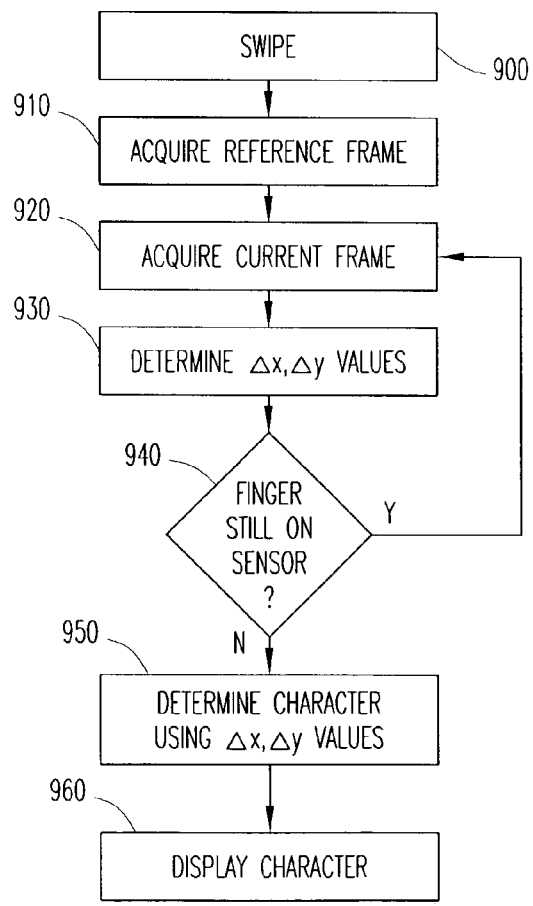
FIG. 17

SYSTEM AND METHOD FOR TIME-SPACE MULTIPLEXING IN FINGER-IMAGING APPLICATIONS

CROSS-REFERENCE TO RELATED APPLICATIONS

This U.S. Nonprovisional for Patent is related by subject matter to copending and commonly assigned U.S. Nonprovisional for Patents Ser. Nos. 10/419,226 and 10/418,968 filed on even date herewith. U.S. Nonprovisional for Patents Ser. Nos. 10/419,226 and 10/418,968 are hereby incorporated by reference in their entirety.

BACKGROUND OF THE INVENTION

1. Technical Field of the Invention

The present invention relates generally to the field of image acquisition. More specifically, the present invention relates to systems and methods for obtaining and processing images of fingerprints for navigation and recognition purposes.

2. Description of Related Art

The use of fingerprints for identification purposes can be dated back for centuries. For example, in $14^{th}$ century Persia, various official government papers included fingerprints (impressions), and one government official observed that no two fingerprints were exactly alike. In recent times, fingerprints play an important role in what is known as biometrics, which refers to the identification of an individual based on his or her physiological or behavioral characteristics. Biometrics enables automatic personal identification for a number of applications, such as criminal investigations, physical access to facilities and electronic access to computers and/or data on computer systems.

Fingerprints can now be acquired directly in the form of a digital image, without the need for an intermediate step of obtaining an impression of the fingerprint on paper, as was traditionally done. Digital fingerprints can be stored and processed in subsequent fingerprint enhancing and fingerprint matching applications. In order to capture a fingerprint image with enough features for recognition, a certain resolution and finger tip area are required. For example, the Federal Bureau of Investigations (FBI) recommends a 12×16 mm finger tip area, with 400 dpi resolution. In other applications where size and cost are important factors, smaller finger tip areas, with the same or lower resolutions, can be used. For example, a 9×12 mm finger tip area, with a resolution as low as 300 dpi, has been used in many applications. However, in smaller area and/or lower resolution fingerprint imaging applications, the finger-recognition algorithmic performance is usually inferior due to the reduction in the number of captured features.

For some applications, dedicating an area of even 9×12 mm to capture a fingerprint image is undesirable. For example, in the design of cell phones, laptop computers, personal digital assistants, electronic mice and other electronic devices, there is a trend towards miniaturization of the device itself, while at the same time offering more features. Therefore, in order to provide finger recognition capabilities on such electronic devices, the sensing area needs to be as small as possible. However, there is not currently a fingerprint scanner available that has a small enough sensing area for implementation on such electronic devices, while still enabling adequate finger-recognition algorithmic performance.

Another feature many electronic devices also provide is a navigation mechanism for controlling a cursor or pointer on a screen. By far, the most popular navigation mechanism in PC usage is the mouse. Recently, optical mice have been developed that are able to navigate on nearly any arbitrary surface using a tracking algorithm that correlates sequential images in the direction of movement. For example, U.S. Pat. No. 6,281,882, entitled PROXIMITY DETECTOR FOR A SEEING EYE MOUSE, which is hereby incorporated by reference in its entirety, describes an optical mouse that images the spatial features of a surface below the mouse and compares successive images to ascertain the direction and amount of movement. In addition, as described in U.S. Pat. No. 6,057,540, entitled MOUSELESS OPTICAL AND POSITION TRANSLATION TYPE SCREEN POINTER CONTROL FOR A COMPUTER SYSTEM, which is hereby incorporated by reference in its entirety, an optical finger navigation device has also been developed that detects motion of the finger and translates the finger motion into corresponding motion of the cursor or pointer on the screen.

Placing separate sensing areas for finger recognition and finger navigation on the same electronic device is inefficient from both a cost perspective and a space perspective. However, there is not currently a fingerprint scanner available capable of performing both finger recognition and finger navigation. Therefore, what is needed is an optical mechanism of combining finger recognition and finger navigation using a single sensing area of a size sufficiently small for integration with electronic devices. In addition, what is needed is a cost-effective imaging system capable of performing both finger recognition and finger navigation, while minimizing power consumption and space required on small and/or portable electronic devices.

SUMMARY OF THE INVENTION

Embodiments of the present invention provide an apparatus for imaging a fingerprint in at least two different modes of operation to provide both finger recognition and finger navigation applications. Multiple light sources are capable of being sequentially selected for illumination of corresponding partitions of a finger interface upon which a user places a finger (or thumb). Either multiple light sources are sequentially selected for illumination or a single light source is selected for illumination, depending on the selected mode of operation. A single sensor captures light reflected from the finger in all illuminated partitions as sequential partition images. The sensor further outputs image data corresponding to the captured partition images for processing in one of the at least two different modes.

Further embodiments provide an imaging system having a mode switch that selects between the at least two different modes for processing of the image data. The mode switch further selects one or more of the light sources for illumination of the desired partitions during operation of the image processing system in one of the at least two modes. The selection of light sources can further be made sequentially to process a complete image of the finger area pressed against the finger interface. The image data received from the image sensor(s) corresponding to the selected light source(s) is provided to a processor programmed to process the image data in one of the at least two modes.

In finger navigation mode, the image data is processed using a tracking algorithm capable of correlating sequential images to ascertain navigation information indicating the magnitude and direction of movement of the finger. The images are correlated using the micro texture features (e.g., ridges and valleys) in the respective portions of the fingerprint captured by the image sensor.

In finger recognition mode, the image data is processed using both the tracking algorithm and a stitching algorithm that combines sequential images in order to form one continuous image of the fingerprint having a sufficient number of micro texture features for fingerprint matching. The stitching algorithm uses the navigation information determined by the tracking algorithm to determine overlap between successive images.

In further embodiments, the imaging system is capable of operating in additional modes for other types of optical navigation applications, such as a stylus mode. In stylus mode, the navigation information extracted from the image data representing the sequence of images of the finger is used to determine the finger strokes made by the user that are associated with a desired letter, number or punctuation mark. Another mode of operation of the imaging system is a blinking node, in which the light source is used as a message indicator light.

Using a single sensing area to provide image data for both finger recognition and finger navigation applications reduces the size and cost of implementing these applications onto an electronic device. In addition, by making the sensing area smaller than the conventional 9×12 mm sensing area used for finger recognition, a finger recognition application can be implemented on small and/or portable electronic devices, such as cell phones, laptop computers, personal digital assistants and electronic mice. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 16A is a pictorial representation of finger strokes made by a user on the swipe module in stylus mode;

FIG. 16B is a front view of a cell phone having a display indicating a letter associated with the finger strokes made in FIG. 16A;

FIG. 17 is a flowchart illustrating an exemplary process for operating in stylus mode;

DETAILED DESCRIPTION OF EXEMPLARY EMBODIMENTS

The numerous innovative teachings of the present application will be described with particular reference to exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
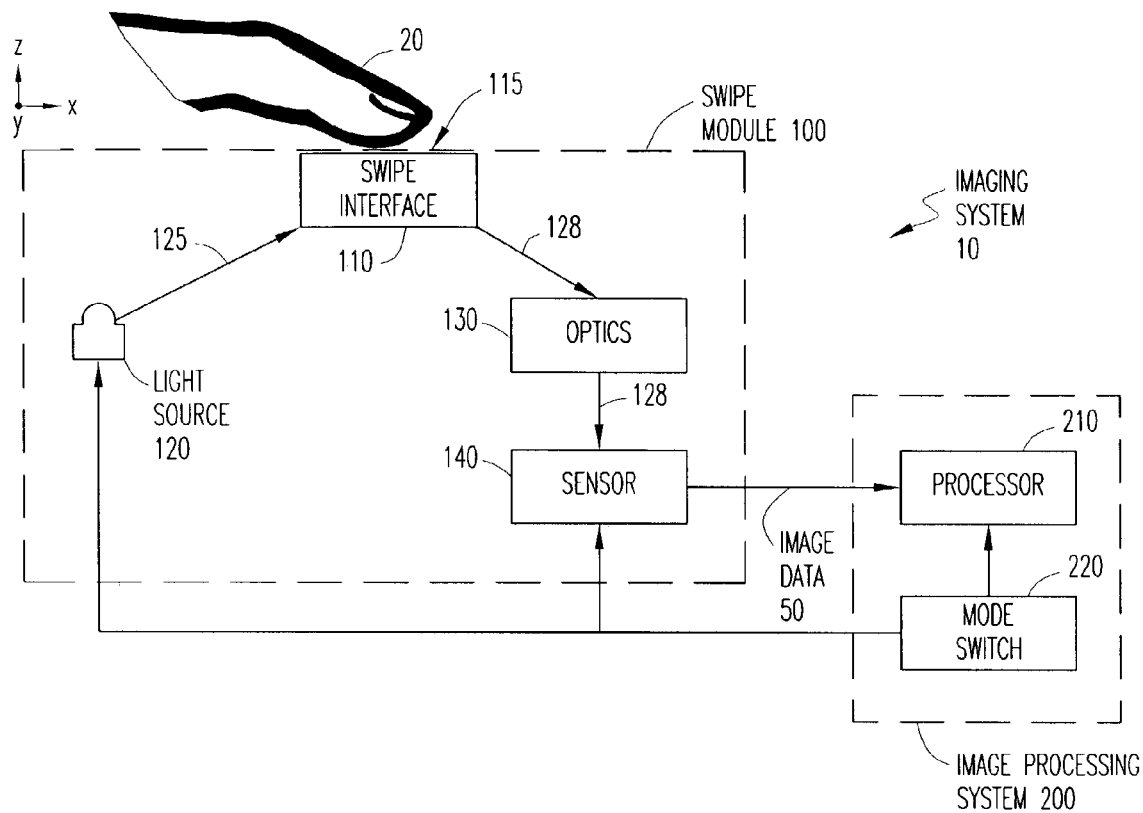
FIG. 1 is a block diagram illustrating an imaging system having a swipe module and an image processing system capable of operating in at least two different modes to provide both finger navigation and finger recognition.

FIG. 1 illustrates an imaging system 10 capable of operating in at least two different modes, one of which is a finger navigation mode and another of which is a finger recognition mode. Other modes are possible, depending on the application of the imaging system 10. For example, the imaging system 10 can be programmed to operate in a stylus mode, in which finger strokes are used to represent written letters, numbers, punctuation marks and other written forms of communication in a convenient and efficient manner. The imaging system 10 includes an apparatus, hereinafter referred to as a swipe module 100, for capturing image data 50 representing an image of a human finger 20 and an image processing system 200 for processing the image data 50 in one of the at least two different modes. As used below, the term "finger" includes any digit (finger, thumb or toe) or a human hand or foot.

The swipe module 100 includes a swipe interface 110 having a top surface 115 upon which a user can press and move a finger 20. The top surface 115 may be flat, or preferably, have a slight curvature. For example, a convex curvature aids in enlarging the sensing area of the top surface 115. The sensing area is the portion of the top surface 115 that is in focus for capturing an image of the finger 20 pressed against the top surface 115. In preferred embodiments, the sensing area includes the entire top surface 115 of the swipe interface 110. The swipe interface 110 may be formed of glass or other wear resistant material that is transparent to light emitting from a light source 120 illuminating the top surface 115 of the swipe interface 110.

In one embodiment, the swipe interface 110 is elongated in shape to provide a sensing area less than the area of the tip of a human finger in at least one dimension. The area of the tip of the human finger is defined as the conventional 9×12 mm sensing area. Using the axes shown in FIG. 1, in one embodiment, the swipe interface 110 is elongated in the y-direction. As an example, the swipe interface 110 can be approximately 7–9 mm in the y-direction and 1 mm in the x-direction. In other embodiments, the swipe interface 110 may be larger in the x-direction, up to 2 mm in some areas, to enable better performance at the cost of larger area. As shown in FIG. 1, the user's finger 20 is positioned on the swipe interface 110 with the length of the finger 20 from the finger tip to the base of the finger 20 in the x-direction and the width of the finger 20 across the sides of the finger 20 in the y-direction. Therefore, the length of the finger 20 is shown orthogonal to the elongated direction of the swipe interface 110 to capture images of a portion of the tip of the finger 20 across the width of the finger 20. However, it should be understood that in other embodiments, the length of the finger 20 may be axially rotated to any position with respect to the elongated direction of the swipe interface 110. For example, the length of the finger 20 may be parallel to the elongated direction of the swipe interface 110.

The light source 120 can be any suitable source of electromagnetic radiation (light 125). By way of example, but not limitation, the light source 120 can be a single light emitting diode (LED), multiple LEDs arranged to illuminate different portions of the swipe interface surface 115 or an array of LEDs designed to emit light 125 at a desired average intensity. The wavelength of light 125 emitted from the light source 120 is selected to maximize reflection of the light 125 from human skin and enable the reflected light 128 to be distinguished from unwanted light signals. In addition, the wavelength of the light 125 can be chosen based on user or manufacturer preferences. For example, some manufacturers may prefer blue light to red light in certain applications. The light source 120 can be in an "on state" in a continuous mode with either a steady or variable amount of illumination or in a duty-cycle mode, where the light source 120 is pulsed on and off to control the exposure by servoing the average amount of light. The intensity of illumination can be controlled using any known technique.

Illumination optics (not shown) can also be used to direct the light 125 towards the swipe interface 110 at the desired angle of incidence. For example, illumination optics could consist of LED dome lenses or a light pipe that channels the light 125 towards the swipe interface 110 with a minimal amount of light loss. It is known in the art that the preferred angle of incidence for illuminating opaque material is a grazing angle within the range of five to twenty degrees. An angle of incidence in this range provides a high signal-to-noise ratio of image data representing inherent structural features of the object being imaged. However, due to the transparency of skin, such oblique angles are not necessary for adequately capturing image data 50 representing an image of the user's finger 20. Therefore, the selection of the angle of incidence is largely dependent upon the design of the swipe module 100, such as the number of type of LEDs used, the thickness of the swipe module 100 in the y-direction and the optics (illumination and image transfer) employed.

When the tip of a finger 20 is pressed against the top surface 115 of the swipe interface 110, ridges and valleys in the skin, referred to collectively as micro texture features, are visible in the plane of the top surface 115. Image transfer optics 130 directs light 128 reflected from those micro texture features onto an array of photo detectors that is part of an optical image sensor 140, which can be a CCD (Charge Coupled Device), a CMOS—APS (Complimentary Metal Oxide Semiconductor—Active Pixel Sensor) or any other type of optical sensor known in the art. Optical image sensors 140 are preferred over thermal or capacitive image sensors due to the magnification/demagnification mechanisms that can be used with optical image sensors to reduce the silicon area. Thermal and capacitive image sensors typically require the silicon area to be equivalent in size to the sensing area. In addition, capacitive image sensors typically produce an electrostatic discharge, which can decrease the signal-to-noise ratio, and thus degrade the image.

The optical image sensor 140 acquires an image of the micro texture features in the form of image data 50 representing the intensity of the reflected light 128 measured at each photo detector. Each photo detector captures a picture element (pixel) of the image, and all pixels are combined to form the complete image. The photo detectors can be, for example, photodiodes or phototransistors arranged in an elongated array parallel to the elongated direction of the swipe interface. For example, as shown in FIG. 1, both the swipe interface 110 and the sensor 140 are elongated in the y-direction. The size of the elongated array is dependent upon the magnification of the optics. For example, in one embodiment, the magnification of the optics is less than unity in a 1:3 ratio. Therefore, if the size of the sensing area (top surface 115) is 9 mm×1 mm, the size of the sensor 140 need only be 3 mm×0.3 mm. Since the features on the fingertip 20 are large enough to view unaided with the human eye, the sensor 140 area can be reduced using a magnification less than unity to reduce the cost of the sensor 140 and also to reduce the size of the swipe module 100. However, it should be understood that other magnifications less than unity, near unity or above unity can also be used, depending on the size constraints of the swipe module 100 and the manufacturer's preferences.

Each photo detector has a photo sensitive region between 5 and 60 μm square, with the spacing between the photo detectors designed to achieve the desired spatial resolution of the sensor 140. For example, on a 3 mm×0.3 mm pixel area, to achieve a resolution of 400 dpi in the finger sensing area of 9 mm×1 mm requires 144×48 photo detectors of a size of 21 μm by 21 μm. Regardless of the desired resolution, the size of the photo detectors and the spacing between the photo detectors is constructed to have at least one (preferably more than one) photo detector per image micro texture feature, and the overall size of the photo detector array is large enough to receive an image having several micro texture features.

The image sensor 140 provides image data 50 (e.g., raw pixel values) to a processor 210 within the image processing system 200 capable of processing the image data 50 in at least one of the at least two different modes. Separate processors 210 may be used for each mode, or one processor 210 may be programmed to operate in all modes. The processor 210 can be any microprocessor, microcontroller or other processing device capable of processing the image data 50 in the selected mode and can also be embedded on the same chip as the image sensor 140. A mode switch 220 selects between the different modes and controls the exposure time of the sensor 140, the frame rate and the intensity of illumination of the light source 120, as will be discussed in more detail below. The mode switch 220 can be toggled by a user depending on the application desired by the user and/or can be preset to toggle upon the completion of a task. For example, in one embodiment, the mode switch 220 can be initialized in finger recognition mode, and upon a positive fingerprint identification, automatically toggle to finger navigation mode.

As discussed above, the selection of one mode or another by the mode switch 220 determines how the image data 50 is processed by the processor 210. In addition, the exposure time of the sensor 140 can vary depending on the selected mode. For example, in finger navigation mode, the user may move the finger more rapidly and erratically over the swipe interface 110 than in finger recognition mode, allowing more stray light into the image. In this case, the mode switch 220 can reduce the exposure time of the sensor 140 to reduce the amount of stray light detected, and thus, the amount of noise in the image.

In addition to or instead of controlling the exposure time, the mode switch 220 can control the intensity of light 125 emitted from the light source 120 depending on the selected mode. For example, in finger recognition mode, the mode switch 220 can increase the intensity of illumination compared with the illumination intensity in finger navigation mode to increase the signal-to-noise ratio and improve the accuracy of fingerprint matching. In other embodiments, the swipe module 110 can perform a "hold" function that suspends production of image data 50 and reduces the intensity of light 125 emitted by the light source 120 when the user's finger is not engaged with the swipe module 110. The swipe module 100 can initiate the "hold" function when the reflected light 128 no longer reaches the photo detectors with the same intensity, if at all, due to the reflecting surface (i.e., the finger 20) being too far away or simply not in view. Even in an intensely lit environment, the "hold" function can be initiated in response to the outputs of the photo detectors becoming largely uniform.

Furthermore, the mode switch 220 can control the frame rate at which the sensor generates sets of image data representing successive images depending on the selected mode. For example, in finger recognition mode, the user typically swipes the finger 20 at a slower rate than in finger navigation mode. In addition, in finger recognition mode, successive images are stitched together to form a complete image, whereas in finger navigation mode, successive images are compared to determine movement. Therefore, the overlap between successive images in finger recognition mode need only be minimal compared to in finger navigation mode. As an example, in finger recognition mode, if the user moves the finger 25 mm per second on a sensing area of width 1 mm, a frame rate of 26 frames per second is sufficient to capture a complete image of the fingerprint. Frame rates up to 500 frames per second may be needed in finger navigation mode.

The imaging system 10 can be included within a single electronic device or within multiple electronic devices. For example, the swipe module 100 can be implemented in a remote electronic device, such as a mouse, while the image processing system 200 can be implemented on a personal computer having an interface to the mouse. As another example, the swipe module 100 and image processing system 200 can both be implemented in small and/or portable electronic device, such as a cell phone, laptop computer or PDA. It should be understood that if the imaging system 10 is implemented entirely in a single electronic device, the image processing system 200 can be included within the swipe module 100 or connected to the swipe module 100.

The swipe module 100 has a thickness in the z-direction dependent upon the requirements of the electronic device. For example, many electronic devices dictate a thickness of less than 5 mm. In order to build a swipe module 100 within the thickness specifications of the electronic device, various techniques for folding the optical path of the light or reducing the size of the optics can be used.

Figure 2:
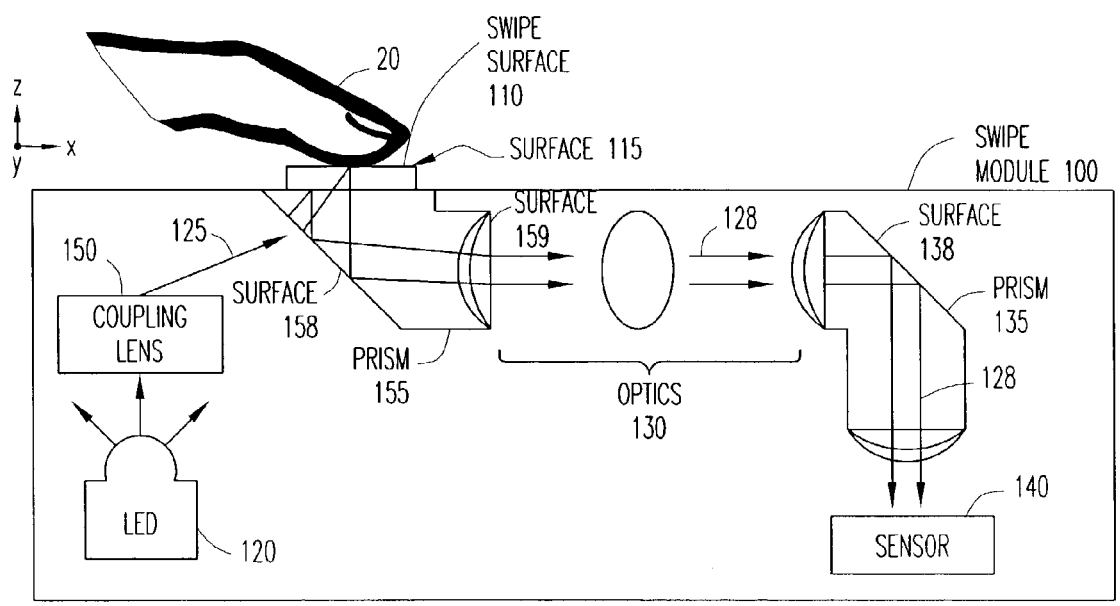
FIG. 2 is a simplified and magnified pictorial side view of the main components of the swipe module in accordance with one embodiment of the invention.

One example of folded optics is shown in FIG. 2. FIG. 2 illustrates a simplified and magnified pictorial side view of an exemplary swipe module 100. Light 125 emitted from the LED 120 is coupled by a coupling lens 150 towards a prism 155 that directs the light 125 at a desired angle of incidence to the swipe interface 110. Depending on the shape of the prism 155 and angle of incidence, the light 125 may be directed using a total internal reflection (TIR) mechanism. In other embodiments, the light 125 may be directed using a reflected light mechanism. In FIG. 2, the light 125 passes through a first surface 158 of the prism 155 and refracted towards the top surface 115 of the swipe interface 110 at the desired angle of incidence. Light 128 reflected back from the finger 20 pressed against the surface 115 of the swipe interface 110 is internally reflected off the first surface 158 of the prism 155 and passes through a second surface 159 of the prism 155.

The reflected light 128 exiting from the prism 155 travels in the x-direction, orthogonal to the elongated direction of the swipe interface 110, and passes through magnification optics 130 that directs the reflected light 128 towards another prism 135. The prism 135 internally reflects the light 128 off of surface 138 to redirect the light 128 in the z-direction to the sensor 140. By utilizing folded optics in the x-direction, instead of traditional optics in the z-direction, the thickness of the swipe module 110 in the z-direction can be reduced. It should be understood that additional optical components, such as apertures and lenses, can also be used in the illumination optics 150 and/or image transfer optics 130. In addition, other optical arrangements can also be used to fold the optical path of the light instead of the optical arrangement shown in FIG. 2.

Figure 3A:
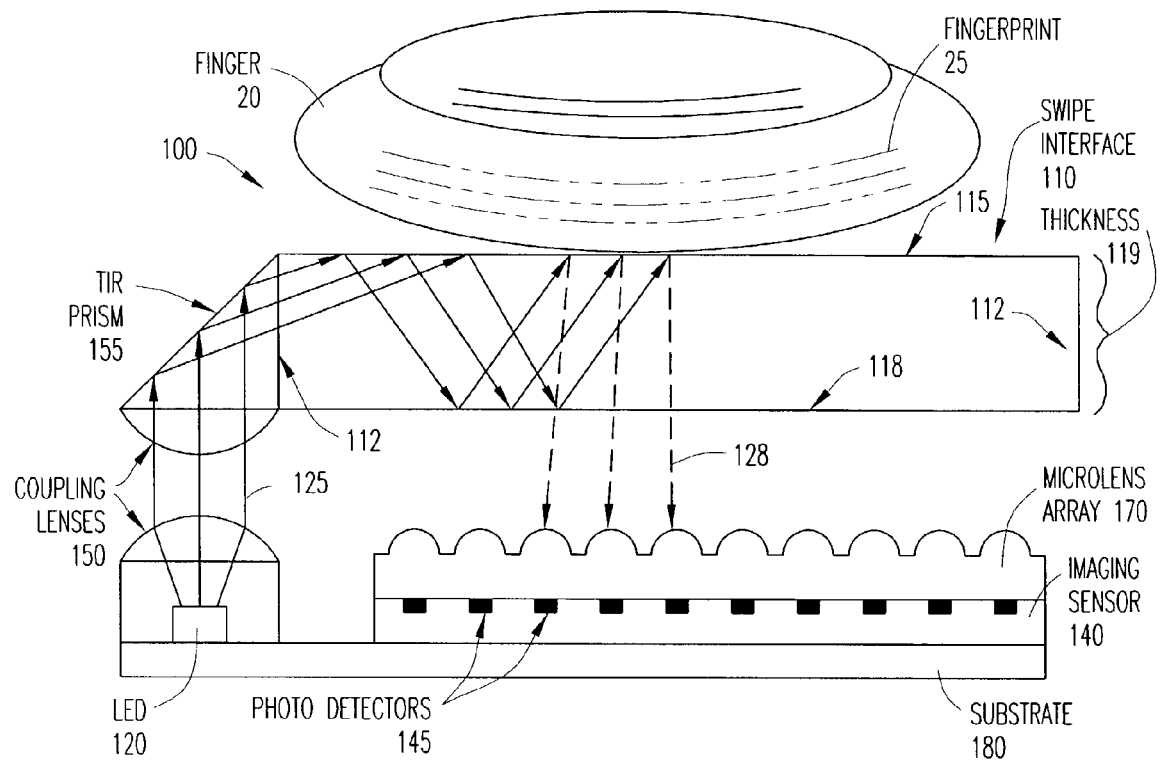
FIGS. 3A and 3B are magnified cross-sectional views of the main components of the swipe module in accordance with another embodiment of the invention.
Figure 3B:
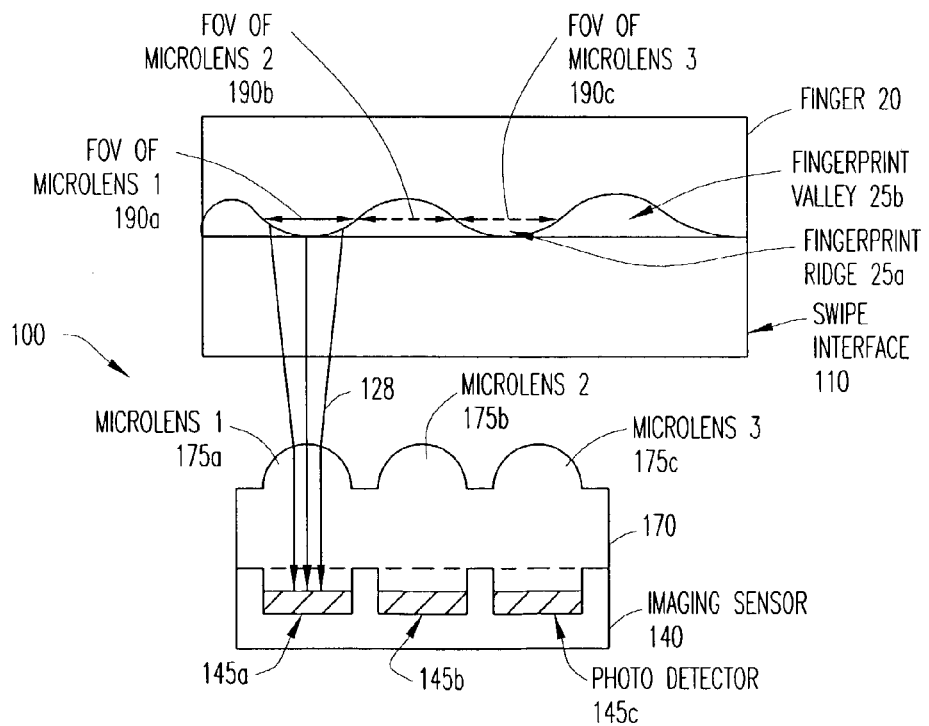

FIGS. 3A and 3B illustrate one example of reducing the size of the optics to fit within the thickness tolerances of the swipe module 100. FIGS. 3A and 3B are magnified side views of an exemplary swipe module 100. Light 125 emitted from the LED 120 is directed by coupling lenses 150 to a prism 155. The coupling lenses 150 include opposing convex surfaces capable of collimating the light 125 diverging at a narrow angle from the LED 120. The shape and position of the prism 155 within the swipe module 100 is designed to either direct the light 125 at a desired angle of incidence to the swipe interface 110 for reflection of the light or to direct the light 125 to the swipe interface 110 for multiple total internal reflections within the swipe interface 110, the latter being illustrated.

To perform multiple TIRs within the swipe interface 110, the side internal surfaces 112 orthogonal to the top surface 115 of the swipe interface 110 are preferably coated with a light-absorbing material to absorb reflected light at the sides. In other embodiments, the side internal surfaces 112 can be mirror-finished. Light 125 is directed to the top surface 115 at an angle of incidence greater than the critical angle of the swipe interface 110 material to create a total internal reflection of the light 125. The total internally reflected light 125 from the top surface 115 is directed to a bottom surface 118 parallel to the top surface 115 at an angle of incidence greater than the critical angle to create another total internal reflection of the light 125. The thickness 119 of the swipe interface 110 is approximately 0.5–1 mm to enable a thinner swipe module 100 (e.g., 2 mm).

Light 128 reflected from the finger 20 is passed through the bottom surface 118 of the swipe interface 110 and focused by a microlens array 170 onto an imaging sensor 140 having an array of photo detectors 145 thereon. The LED 120, dome lens 150 and imaging sensor 140 are formed over a substrate 180 of the swipe module 100.

As shown in FIG. 3B, each microlens 175a, 175b, 175c in the microlens array 170 is coupled with one photo detector 145a, 145b, 145c, respectively, in a one-to-one manner. For example, microlens 175a focuses light 128 reflected from a portion of a fingerprint 25 (e.g., either a fingerprint ridge 25a or a fingerprint valley 25b) onto corresponding photo detector 145a. The size of each photo detector 145 is selected to limit the field-of-view (FOV) 190a, 190b, 190c of each photo detector 145a, 145b, 145c, respectively, so that there are no overlapping FOV's 190 with adjacent microlenses 175.

Depending on the processing mode, the image data can be acquired from all of the photo detectors 145 or only a portion of the photo detectors 145 in the photo detector array. For example, in finger recognition mode, the entire 9 mm×1 mm sensing area is needed to capture a complete image of the fingerprint 25. However, in finger navigation mode, only a few fingerprint 25 features are required to determine the direction of movement, and in many cases, the finger 20 is not positioned in the entire 9 mm×1 mm sensing area. Therefore, in finger navigation mode, image data may only need to be acquired from a portion of the photo detectors 145 that detect light from the area of the swipe interface 110 in contact with the finger 20.

Figure 4:
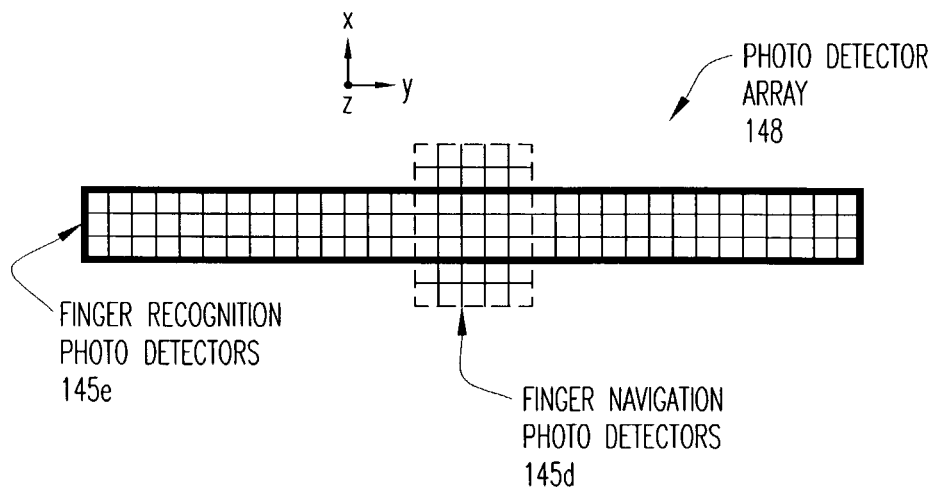
FIG. 4 illustrates an exemplary pixel array of the image sensor of the present invention.

As shown in FIG. 4, to reduce the number of photo detectors 145 required for finger navigation while capturing sufficient image data to determine motion of the finger, the photo detector array 148 can be modified to accommodate a wider sensing area in the center of the array 148 for finger navigation. In FIG. 4, an assumption is made that the placement of the finger on the swipe interface in finger navigation mode is primarily at the center of the elongated direction (y-direction) of the sensing area. An assumption is also made that in finger recognition mode, a portion of the finger is at the center of the elongated direction of the sensing area, and the center portion can be used to obtain finger navigation information to enable stitching of successive images, as described in more detail below in connection with FIGS. 14 and 15. Therefore, in the arrangement of photo detectors 145 shown in FIG. 4, the corresponding swipe interface (not shown) has a general size of 9 mm×1 mm, but the central region of the swipe interface is widened in the x-direction to provide a 2 mm×2 mm central region. The central region is used for finger navigation. Correspondingly, the central region (shown by dotted lines) of the sensor 140 is widened in the x-direction to detect light from the widened central region of the swipe module. A resolution of 400 dpi corresponds to approximately 16 photo detectors per mm, which corresponds to 144×16 finger recognition photo detectors 145e (shown within the solid black line), and 32×32 finger navigation photo detectors 145d in the central region of the photo detector array 148 (shown within the dotted line).

Figure 5A:
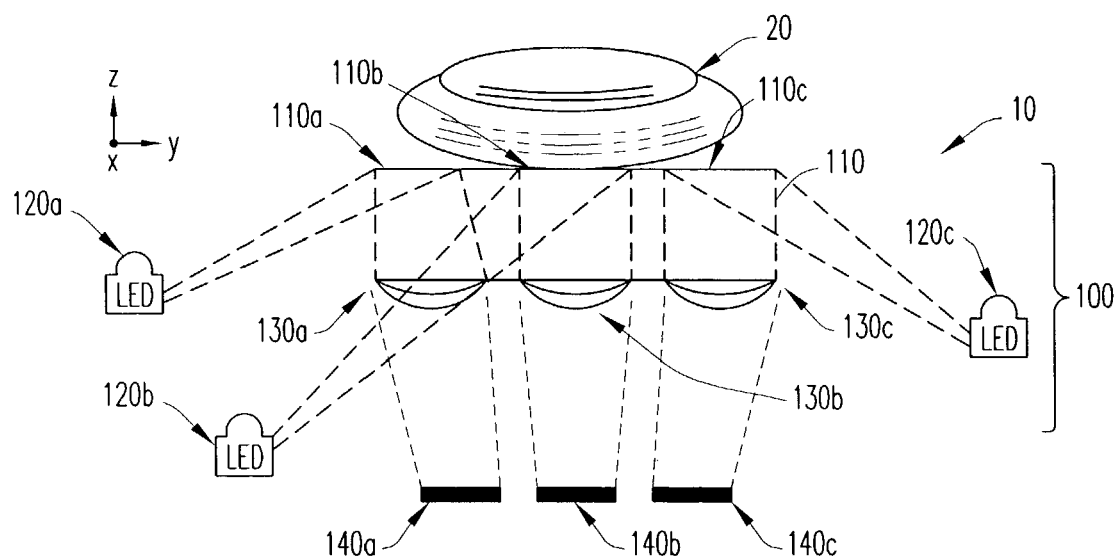
FIG. 5A is a simplified pictorial side view of a swipe module having mode multiplexed illumination of the swipe interface.

To facilitate using different regions of the sensor and different portions of the sensing area for different modes (e.g., finger recognition and finger navigation), multiple light sources and/or multiple sensors can be used to illuminate and image different finger areas of interest depending on the selected mode of operation. FIG. 5A schematically illustrates one example of the imaging system 10 having a swipe module 10 capable of multiplexing illumination of the swipe interface 110 based on the selected mode. The swipe interface 110 is shown separated into three partitions 10a, 110b and 110c in the y-direction. The swipe interface 110 is further shown illuminated by three LEDs 120a, 120b and 120c. The illumination is aligned such that LED 120a illuminates only the first partition 10a of the swipe interface, LED 120b illuminates only the second partition 110b, and LED 120c illuminates the third partition 110c. The illumination optics are not shown for simplicity purposes. However, it should be understood that separate illumination optics for each LED 120a–120c may be utilized to direct the light from each LED 120a–120c towards the respective partition of the swipe interface 110 associated with the LED 120a–120c.

The illuminated finger area is imaged using image transfer optics 130a, 130b and 130c. The image transfer optics 130a, 130b and 130c are also aligned in the y-direction and in the z-direction such that each separately illuminated partition 10a, 10b and 110c of the swipe interface 110 is imaged onto corresponding sensing regions 140a, 140b and 140c, respectively. Sensing regions 140a, 140b and 140c can be one contiguous sensor, or sensing regions 140a, 140b and 140c may be three sensors separated by circuit-design constraints, as is shown in FIG. 5A. The center sensing region 140b and center partition 110b can be widened in the x-direction, as described above in connection with FIG. 4.

When using separate sensors, the spacing between the different sensors is designed to simplify the optics design and ensure a complete image in finger recognition mode. For example, with swipe interface 110 having an area of 9×1 mm, with each partition 110a, 110b and 110c of the swipe interface 110 being 3×1 mm, each sensing region 140a, 140b and 140c can have an area of 1×0.3 mm, with a 0.25–1 mm spacing in between the sensing regions 140a, 140b, and 140c. In some embodiments, gaps in the acquired image due to the spacing between the sensing regions 140a, 140b and/or 140c may be acceptable, as long as the geometrical relations are known. In other embodiments, overlap between the acquired images may be desirable to facilitate stitching.

Although three separate partitions 110a, 110b and 110c of the swipe interface 110 and three separate sensing regions 140a, 140b and 140c are shown, it should be understood that the swipe interface 110 can be divided into any number of partitions, each of which can be imaged by a separate region of a single sensor or separate sensors. The greater the number of partitions 110a, 110b and 110c used, the less power is required because the intensity of light necessary to illuminate one partition decreases proportionately as the partition size decreases. Reducing the power consumption is an important design parameter in small and/or portable electronic devices. For example, in cell phones, PDAs and laptop computers, where power is supplied by a rechargeable battery, reducing the power consumption increases the battery life.

However, increasing the number of partitions can also increase the complexity in the illumination and image transfer optics, in reading the pixel values off of the sensor(s) and in processing the image data. Furthermore, the illumination design becomes more difficult and costly as the number of partitions increases because the sensing area that is illuminated is smaller and the number of LEDs increases.

In further embodiments, illumination can be designed to provide sequential acquisition of the image of the entire finger area over the swipe interface. For example, LED 120a can be turned "on", while LEDs 120b and 120c are in an off condition, to illuminate only the first partition 110a, which is imaged onto sensing region 140a. The pixel values can be read from sensing region 140a and stored. At a later time, LED 120a is turned "off", and LED 120b is turned "on" to illuminate the second partition 110b, which is imaged onto sensing region 140b. The pixel values can be read off sensing region 140b and stitched with the previous captured image from sensing region 140a, and the resulting stitched image can be stored. Finally, LED 120b is turned "off" and LED 120c is turned "on" to capture the rest of the image in a similar manner. The timing of the sequential partition illuminations is set such that little to no noticeable movement of the finger occurs between the partition images. Sequential acquisition of the image reduces the power consumption by using only one LED at a time.

Figure 5B:
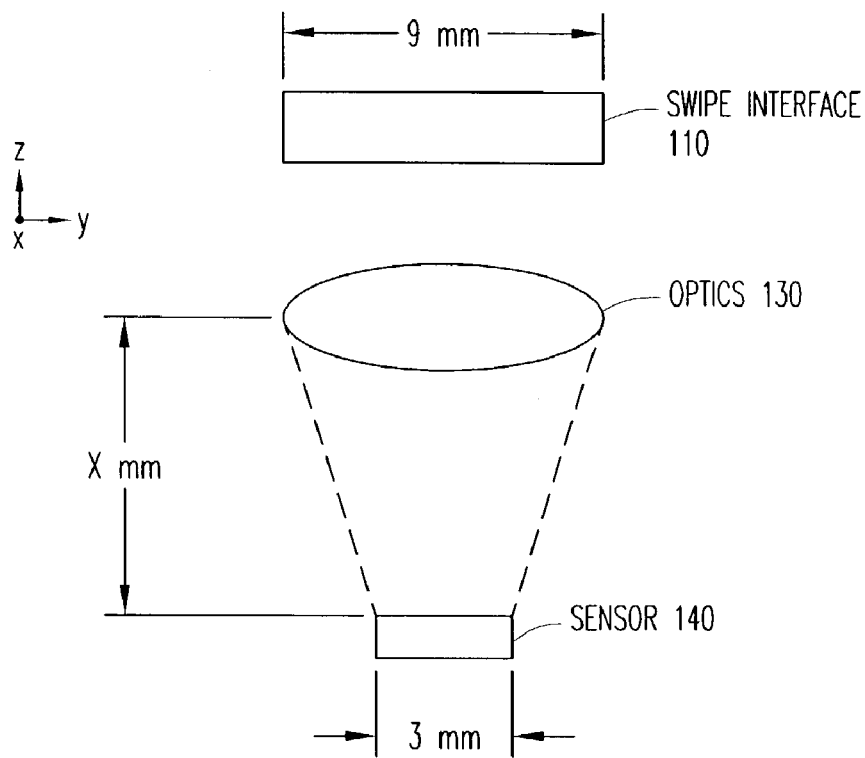
FIGS. 5B and 5C schematically illustrate size reduction of the imaging system using multiplexed illumination of the swipe interface.
Figure 5C:
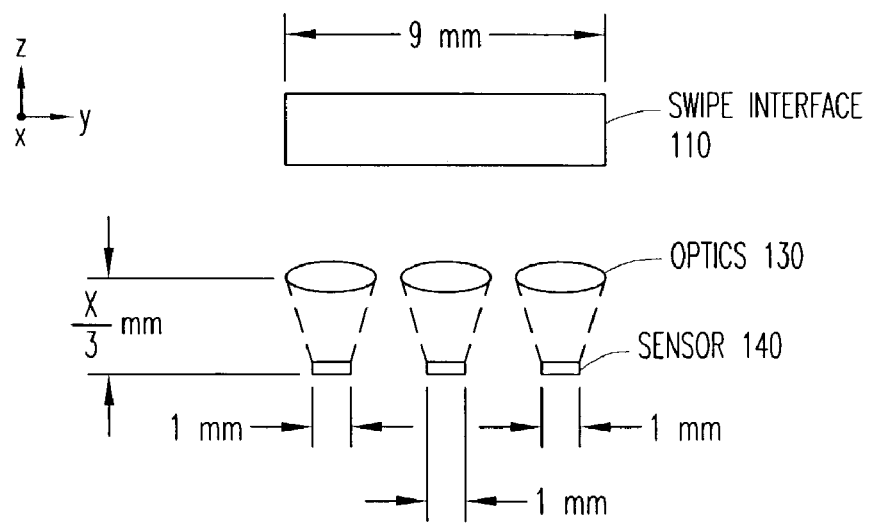
Figure 6A:
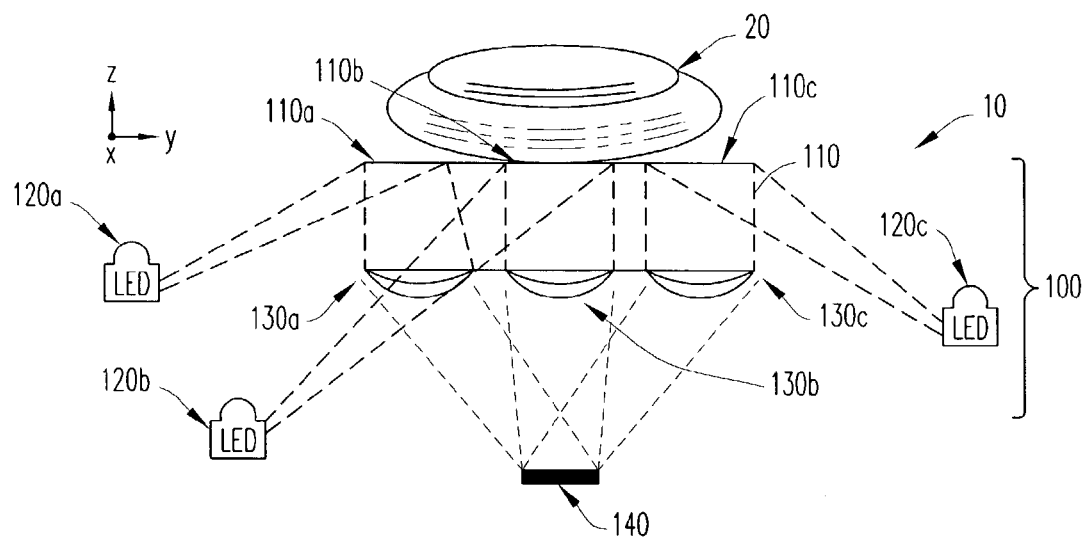
FIG. 6A is a simplified pictorial side view of a swipe module having time multiplexed illumination of the swipe interface.
Figure 6B:
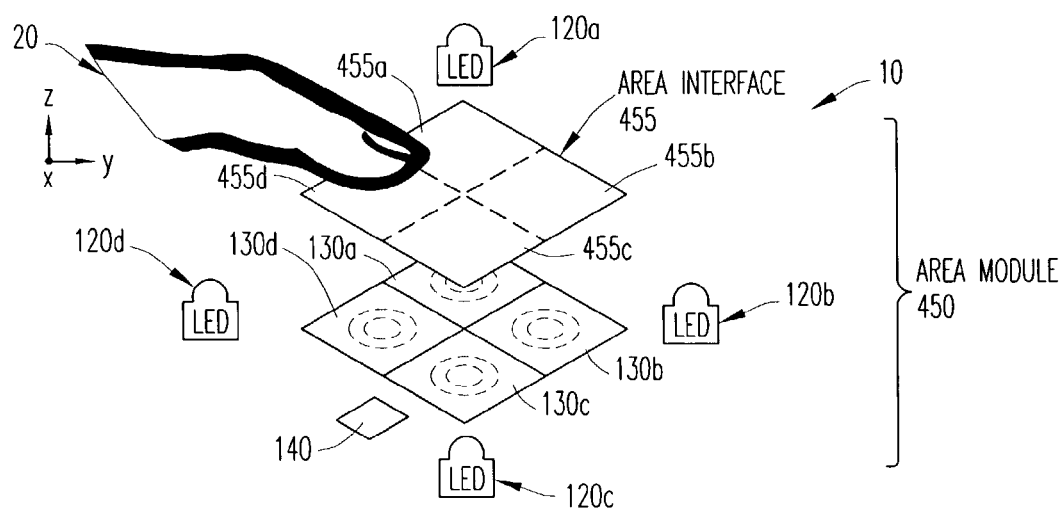
FIG. 6B schematically illustrates time multiplexed illumination of an area module.

Referring now to FIGS. 5B and 5C, multiplexing illumination onto separate sensors or separate regions of a sensor further reduces the size of the swipe module 100. As shown in FIG. 5B, in order to direct the light from the elongated sensing area in the y-direction (e.g., shown as a 9 mm sensing area) of the swipe interface towards a single sensor of 3 mm in the y-direction, the focal length from the optics to the sensor requires a spacing of "X" mm between the optics and the sensor in the z-direction. As shown in FIG. 5C, by dividing the 9 mm sensing area into three separate partitions, each having separate optics for focusing the light from the respective partition towards a respective 1 mm sensor, the spacing between the optics and the sensors in the z-direction is reduced by one-third. Therefore, as shown in FIG. 6B, the spacing between the optics and the sensors is X/3 mm. The reduction in spacing between the optics and the sensors in the z-direction translates into a two-thirds reduction in thickness (in the z-direction) of the swipe module 100. This reduction in size is an important benefit in implementing the finger navigation and finger recognition capabilities small and/or portable electronic devices, such as electronic mice, cell phones, PDAs and laptop computers.

In addition to reducing power consumption and size, time multiplexing illumination of the swipe interface surface can also remove the need for a separate sensor or separate region of a sensor for each partition. For example, as shown in FIG. 6A, a single sensor having a photo detector array size in the y-direction sufficient to capture an image from one of the partitions is used to sequentially capture images from each of the partitions or to capture a single image from one of the partitions, depending on the mode of operation.

The swipe interface is shown separated into three partitions 110a, 110b and 110c in the y-direction. The swipe interface 110 is also shown illuminated by three LEDs 120a, 120b and 120c. The illumination is aligned such that LED 120a illuminates only the first partition 110a of the swipe interface, LED 120b illuminates only the second partition 110b, and LED 120c illuminates the third partition 110c. The illumination optics are not shown for simplicity purposes. However, it should be understood that separate illumination optics for each LED 120a–120c may be utilized to direct the light from each LED 120a-120c towards the respective partition 110a–c of the swipe interface 110 associated with the LED 120a-120c.

The illuminated finger area is imaged using image transfer optics 130a, 130b and 130c. The image transfer optics 130a, 130b and 130c are also aligned in the y-direction and in the z-direction such that each separately-illuminated partition 110a, 110b and 110c of the swipe interface 110 is imaged onto a single sensor 140. In operation, only one partition 110a, 110b or 110c is illuminated at a time, so that images of the different partitions are not layered on top of each other. Therefore, depending on the mode of operation, only one partition 110a, 110b or 110c is illuminated during operation of the imaging system 10 or partitions 110a, 110b and/or 110c are illuminated sequentially to capture each partition image separately.

Time multiplexed illumination is a viable option not only for swipe modules that capture an image of only a portion of a fingerprint and require movement of the finger to form one continuous image of the fingerprint, but also for area modules that capture an image of the entire the fingerprint without requiring movement of the finger. For example, as shown in FIG. 6B, there is illustrated an area module implementing time multiplexed illumination of an area interface 455.

The sensing area of the area interface 455 is shown divided into four partitions 455a–d in the x and y-directions. Four LEDs 120a–120d illuminate the area interface 455, with each LED 120a–120d illuminating one partition 455a–455d, respectively of the area interface 455. The illumination is aligned such that LED 120a illuminates only a first partition 455a of the area interface 455, LED 120b illuminates only a second partition 455b, LED 120c illuminates only a third partition 455c and LED 120d illuminates only a fourth partition 455d. The illumination optics are not shown for simplicity purposes. However, it should be understood that separate illumination optics for each LED 120a–120d may be utilized to focus the light from each LED 120a–120d towards the respective partition 455a–d of the swipe interface 110 associated with the LED 120a–120d.

The illuminated finger area is imaged using image transfer optics 130a, 130b, 130c and 130d. The image transfer optics 130a, 130b, 130c and 130d are also aligned in the x and y-directions and in the z-direction such that each separately illuminated partition 455a, 455b, 455c and 455d of the area interface 455 is imaged onto a single sensor 140. As discussed above in connection with the swipe module, only one partition 455a, 455b, 455c or 455d is illuminated at a time, so that images of the different partitions are not layered on top of each other.

Figure 7A:
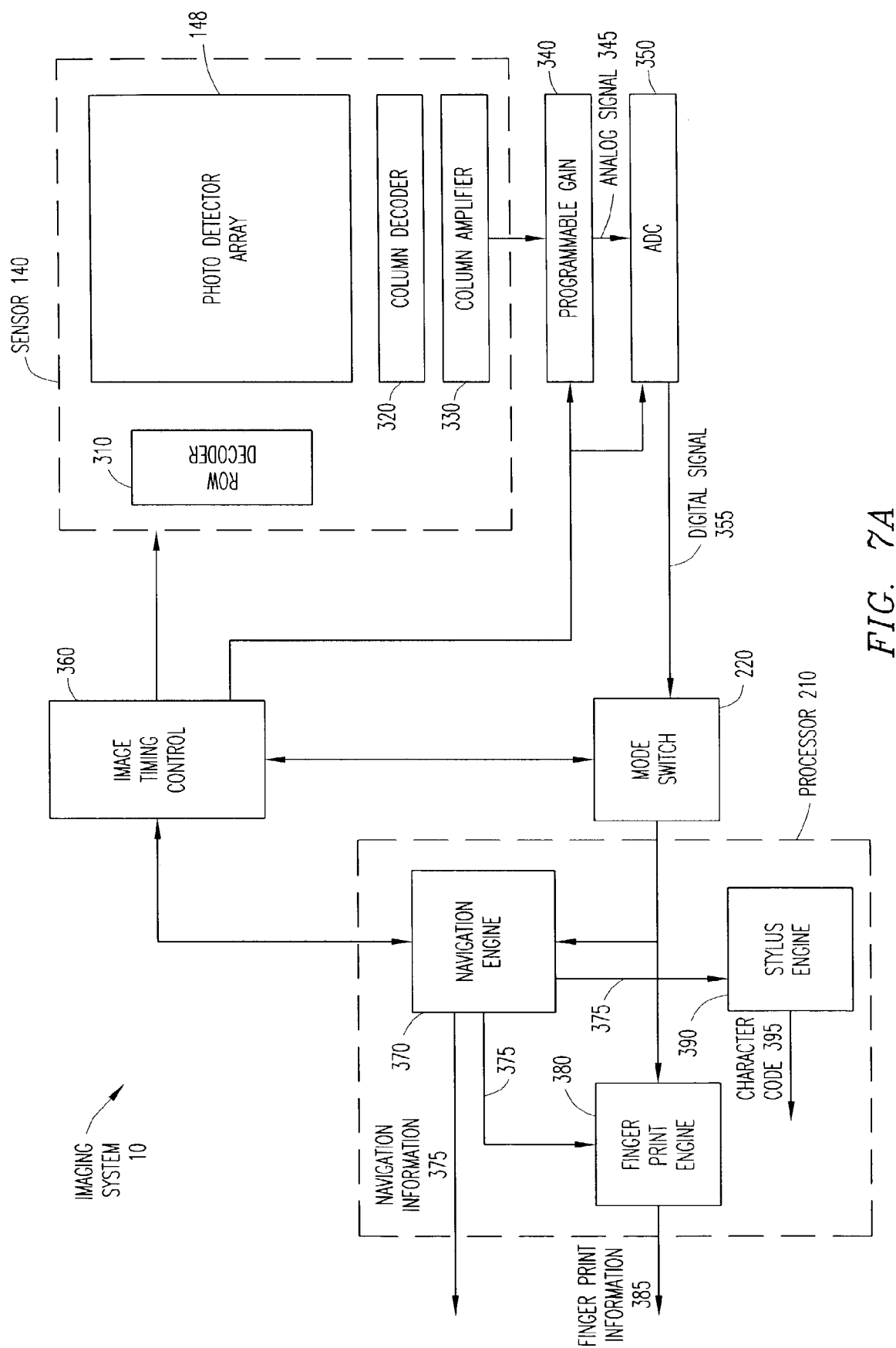
FIG. 7A is a block diagram illustrating exemplary hardware and processing components of the imaging system of the present invention.

FIG. 7A is a block diagram illustrating exemplary hardware and processing components of the imaging system 10 of the present invention. The imaging system 10 includes a sensor 140 having a photo detector array 148 for capturing an image projected thereon and for generating an analog signal 345 representative thereof A row decoder 310 and column decoder 320 select the rows and columns of the photo detector array 148 for reading the analog signal 345 representing the pixel values and resetting the photo detectors. A column amplifier 330 amplifies the analog signal 345 and provides the analog signal 345 to a programmable gain 340 before converting the analog signal 345 to a corresponding digital signal 355 by an analog-to-digital converter (ADC) 350. The ADC 350 can be a six-bit, eight-bit or ten-bit ADC operable at a rate of approximately 25 frames/sec in finger recognition mode and 500 frames/sec in finger navigation mode.

The imaging system 10 further includes the mode switch 220 for selecting the appropriate mode the processor 210 to process the digital signal 355. As discussed above, the mode switch 220 further controls the frame rate and exposure time (shutter speed) of the sensor 140 via image timing control circuitry 360. In finger navigation mode, the digital signal 355 is provided to a navigation engine 370 to determine navigation information 375 indicating the direction and amount of movement of a current image as compared to a previous image, as will be described in more detail below in connection with FIGS. 7 and 8. In other embodiments, the navigation information 375 can be ascertained from one or more additional navigation sensors (not shown) to provide improved tracking of curvilinear motion and rotation of the finger. For example, a pair of navigation sensors can be positioned at opposite ends of the imaging sensor 140 to effectively observe a moving image of the finger and produce an indication of the displacement of the finger relative to the imaging sensor 140.

In finger recognition mode, the digital image 355 is provided to a fingerprint engine 380 to stitch the current image with previous image(s) to produce one complete image of the fingerprint for matching of the fingerprint to a previously stored fingerprint, as described below in connection with FIGS. 9–12. To determine the amount of overlap between the current image and the previous image for stitching of the images together, the digital signal 355 is also provided to the navigation engine 370 to determine the amount of movement (navigation information 375). The number of digital images required to form a complete digital image of the fingerprint varies depending on the frame rate and speed of motion of the finger. However, the resulting complete digital image is stitched to form a digital signal set that represents a 7 mm×12 mm or 9 mm×12 mm (depending on the size of the swipe interface) total sensing area. Such a digital signal is necessary to obtain a sufficient number of features for fingerprint matching.

The fingerprint engine 380 outputs fingerprint information 385, which can represent either a complete image of a fingerprint or the results of a fingerprint matching analysis.

In stylus mode, the digital signal 355 is provided to the navigation engine 370 to determine the navigation information 375 representing the direction and amount of movement. The navigation information is provided to a stylus engine 390 to correlate the navigation information with finger strokes used to identify letters, numbers, punctuation marks or other forms of written communication (hereinafter collectively referred to as characters), as described below in connection with FIGS. 13–14. The digital signal 355 can also be provided to the stylus engine 390 to determine finger lift, indicating the completion of one character and the beginning of another character. The stylus engine 390 outputs character codes 395 that can be used by a host (or processor) to display the associated character to the user on a display associated with the electronic device incorporating the swipe module. For example, the display can be located on the electronic device, such as an LCD of a cell phone. As another example, the display can be located on a screen connected to a personal computer that is connected to a mouse having the swipe module therein. It should be understood that the navigation engine 370, fingerprint engine 380 and stylus engine 390 include the hardware, software and/or firmware required to perform the functions described above, and can be programmed using any type of programming technique, including object oriented programming.

Figure 7B:
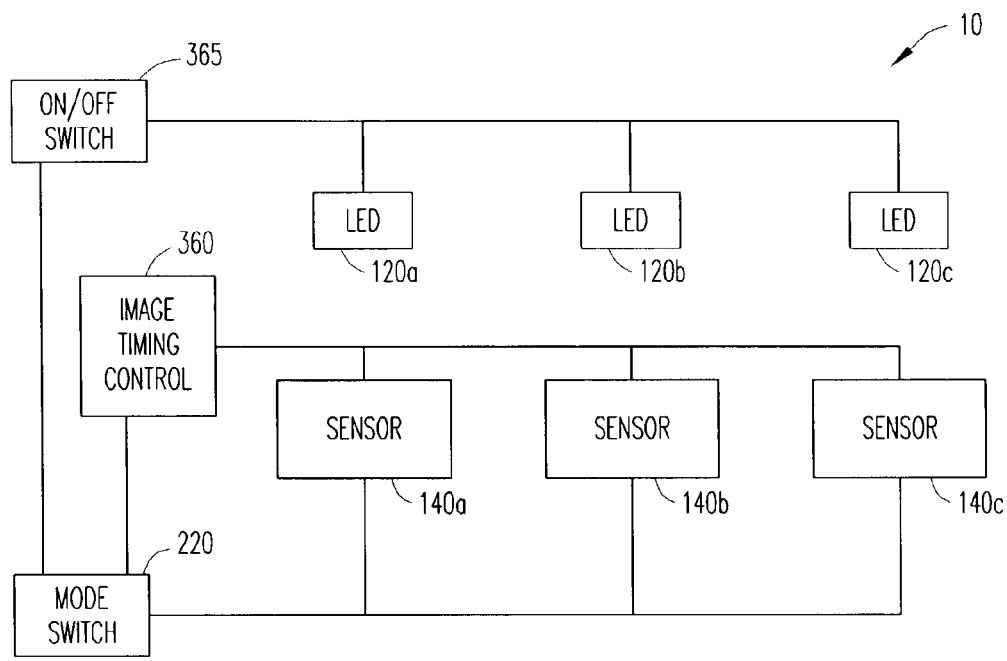
FIG. 7B is a block diagram illustrating exemplary hardware and processing components of a multiplexed imaging system of the present invention.

FIG. 7B is a block diagram illustrating exemplary hardware and processing components of a multiplexed illumination imaging system 10 of the present invention. The imaging system 10 includes sensing regions 140a, 140b and 140c, each for capturing a respective image of an illuminated partition of the swipe interface and for generating an analog signal representative thereof, as discussed above in connection with FIG. 7A.

The imaging system 10 further includes the mode switch 220 for selecting the appropriate mode for processing the image(s). To multiplex illumination based on the selected mode (e.g., selecting one or more partitions for illumination or sequential illumination of the partitions), the mode switch 220 controls the on and off conditions of the LEDs 120a, 120b and 120c via an on/off switch 365. For example, in finger navigation mode, only the center partition may need to be illuminated, and the mode switch 220 can instruct the on/off switch 365 to turn "on" LED 120b and turn "off" LEDs 120a and 120c. As discussed above, the mode switch 220 further controls the frame rate and exposure time (shutter speed) of the sensing regions 140a, 140b and 140c via the image timing control circuitry 360. Each sensing region 140a, 140b and 140c can be separately controlled by the image timing control circuitry 360 depending on the selected mode.

Figure 8:
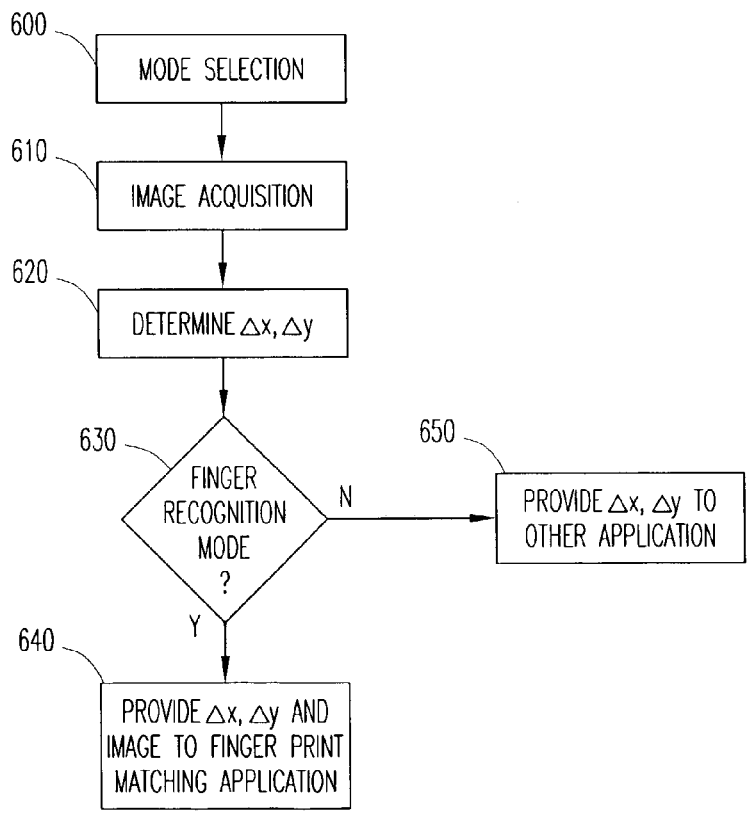
FIG. 8 is a flow chart illustrating an exemplary process for operating in multiple modes.

Turning now to FIG. 8, there is illustrated an exemplary process for an imaging system to operate in multiple modes. Initially, a mode of operation is selected for the imaging system (block 600) by either a user of the imaging system or by predetermined default mode instructions stored in the imaging system. For example, the imaging system may be programmed to operate in finger recognition mode until a positive fingerprint match is made. Thereafter, the imaging system may be set to operate in finger navigation mode to enable the user to move a pointer (or cursor) across a display to select one or more feature options offered by the imaging system or electronic device incorporating the imaging system. One of these feature options could be a stylus mode that the user can select while in finger navigation mode.

After the mode has been selected, successive images of a finger moved over the swipe interface of the imaging system are acquired (block 610) and provided to a tracking algorithm to determine navigation information (e.g., $\Delta x$, $\Delta y$) indicative of the amount and direction of movement of the finger (block 620). If the imaging system is in finger recognition mode (block 630), the navigation information is provided to a fingerprint matching application to stitch the successive images together, using the navigation information, and to compare the imaged fingerprint with a stored fingerprint to authenticate the user (block 640). However, if the imaging system is in another mode of operation, the navigation information is provided to other applications capable of operating in other modes (block 650). For example, another mode of operation could be a finger navigation mode, in which the navigation information can be provided to a pointing application capable of moving the pointer on the display a distance corresponding to the navigation information. In other embodiments, other modes of operation may be possible, such as a stylus mode. If the imaging system is in stylus mode, the navigation information is provided to a stylus application for processing of the navigation information to determine the appropriate character(s).

Figure 9A:
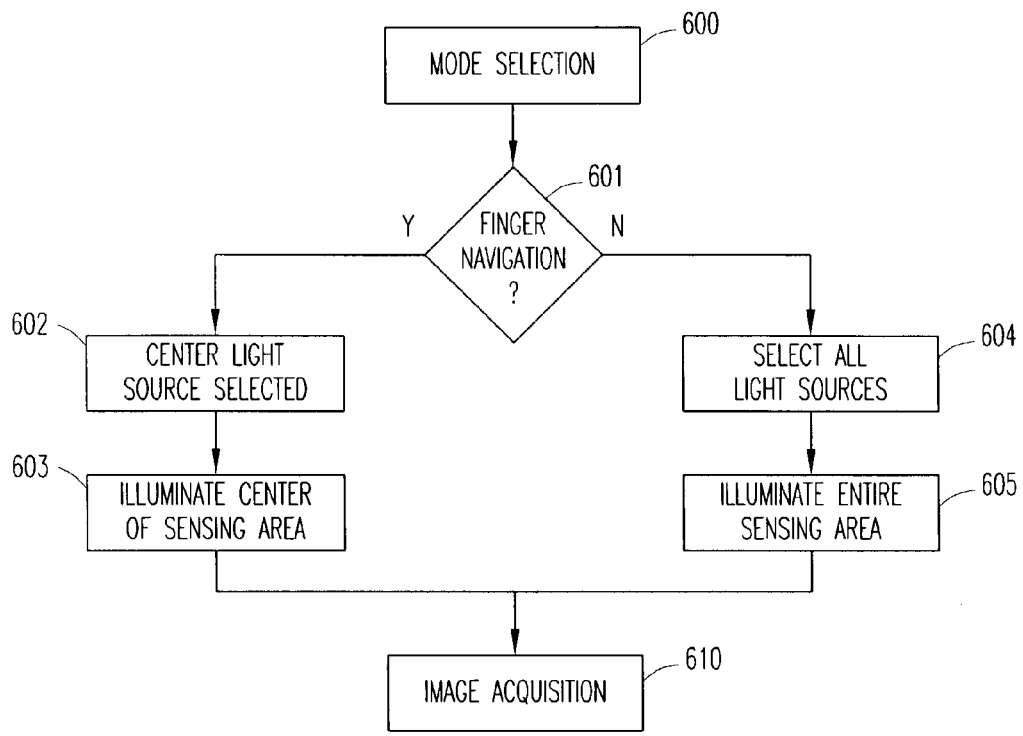
FIG. 9A is a flow chart illustrating an exemplary process for mode multiplexing illumination in multiple modes.

FIG. 9A illustrates an exemplary process for multiplexing illumination depending on the selected mode. If the selected mode of operation (block 600) is the finger navigation mode (block 601), a determination is made of which partition of the swipe interface contains the area of the finger that needs to be tracked. For example, all partitions can be imaged initially, and a decision can be made regarding which partition includes the most interesting features for tracking. As another example, the center partition or central partitions can be selected for tracking purposes. Once the desired partitions are determined, the light source(s) associated with the desired partition(s) are selected (e.g., turned "on") (block 602) to illuminate only those desired partitions (block 603). An image of the finger within the illuminated partitions is acquired by the sensors or regions of the sensor corresponding to the selected light sources/partitions for subsequent image processing (block 610), as described above in connection with FIG. 8.

In finger recognition mode, an image of the entire surface of the finger is required. Therefore, all of the light sources are selected (block 604) to illuminate the whole finger area (block 605) and capture an image of the entire finger area using one or more sensors (block 606). Depending on the arrangement of the sensors, some stitching and/or correcting of the separately acquired images may be required to form a continuous image of the entire finger area. In other embodiments, the separate partitions can be sequentially illuminated to capture the entire image of the finger area. In other modes of operation, one or more of the partitions can be selected to illuminate only those finger areas that are needed for operation of the selected mode.

Figure 9B:
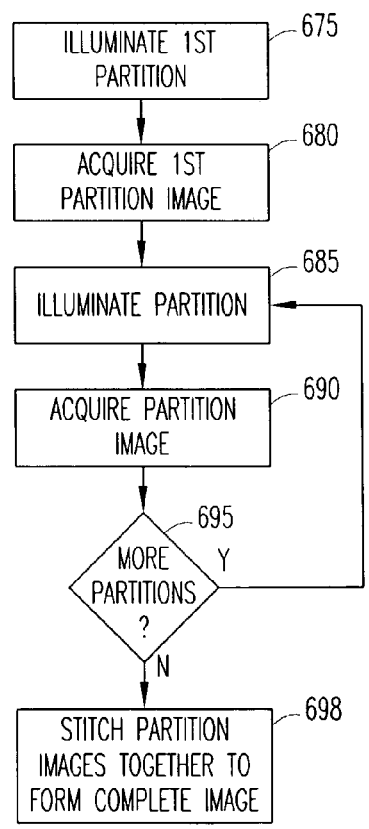
FIG. 9B is a flow chart illustrating an exemplary process for time multiplexing illumination.

For example, as described in the exemplary process of FIG. 9B, to time multiplex illumination of the finger area, a first partition is selected for illumination (block 675) and an image of the first partition is acquired (block 680) by the sensor (e.g., a single sensor for all partitions or a sensor or region of a sensor designated for that partition). Thereafter, the light source illuminating the first partition is turned "off" and another light source for illuminating another partition is turned "on" (block 685). Separate images of each partition are acquired sequentially (blocks 690 and 695) and all of the partition images are combined (e.g., stitched together) to form one continuous image of the finger area (block 698).

A number of different mechanisms can be used to determine the navigation information for use during finger navigation mode, finger recognition mode and stylus mode. For example, as described in U.S. Pat. No. 6,172,354, entitled OPERATOR INPUT DEVICE, which is hereby incorporated by reference in its entirety, movement is detected by cross correlating a pattern in a previous image with the same pattern in a current image. Circular harmonics are used to determine movement of the current image as compared with the previous image to provide rotationally invariant navigation information. Another method for determining navigation information is described in U.S. Pat. No. 6,195,475, entitled NAVIGATION SYSTEM FOR HANDHELD SCANNER, which is hereby incorporated by reference in its entirety. U.S. Pat. No. 6,195,475 models the correlation surface of correlation data representing a relationship between a sample frame and a reference frame as a general two-dimensional Taylor series expansion to determine the displacement of a reference feature contained in both the reference frame and the sample frame.

A further navigation mechanism is taught in U.S. Pat. No. 5,578,813, entitled FREEHAND IMAGE SCANNING DEVICE WHICH COMPENSATES FOR NON-LINEAR MOVEMENT, which is hereby incorporated by reference in its entirety, and briefly illustrated in FIGS. 10 and 11. The navigation mechanism described in U.S. Pat. No. 5,578,813 correlates successive frames of image data by comparing the positions of features within the successive frames. As a first step, a reference frame is acquired upon initiation of the imaging process (block 700). The position of the sensor at a later time is determined by acquiring a current frame of image data from the sensor at the later time (block 710).

Thereafter, the entire content of one of the frames (reference or current) is shifted by a distance of one pixel (corresponding to one photo detector) in each of the eight directions allowed by a one pixel offset trial shift (e.g., a "null" shift, a shift to the right, a shift to the right and down, etc.). For each shift (blocks 720 and 740), those portions of the frames that overlap each other are subtracted on a pixel by pixel basis, and the resulting differences are preferably squared and then summed to form a measure of similarity (correlation figure of merit) within that region of overlap (block 730). In addition, the correlation figure of merit for a "null" shift is also computed for the case where no motion has occurred between frames. It should be understood that larger trial shifts are possible. For example, in other modes of operation, the frame rates may be lower, requiring larger trial shifts to determine the direction of movement. However, the attendant complexity of computing the correlation figures of merit increases as the trial shift amount increases.

The shifting is accomplished by using address offsets for memories that can output an entire row or column of an array at one time. Dedicated arithmetic circuitry is connected to the memory array that contains the frame being shifted and to the memory array that contains the other frame to formulate the correlation figures of merit for each trial shift. Pixel locations along unmatched edges between the shifted frame and other frame do not contribute to the corresponding correlation figures of merit.

The trial shift with the least difference (lowest correlation figure of merit) indicates the direction of movement between the two frames (block 750). From the lowest correlation figure of merit, the navigation information (e.g., $\Delta x$, $\Delta y$) can be calculated (block 760) and output. For example, the navigation information can be output to a pointer application to indicate the current position of the pointer (or cursor) or to another mode application for use in subsequent calculations. The current frame can be used as the reference frame for the next acquired image or the initial reference frame can be re-used with successive current frames. In order to re-use the initial reference frame, the navigation information (direction and displacement data) for the most recent motion is maintained for subsequent shifting and correlation figure of merit computation operations. Each shifting operation effectively throws away some of the reference frame, reducing the size of the reference frame and degrading the statistical quality of the correlation figures of merit. However, when an edge of the shifted and reduced initial reference begins to approach the center of what was the original reference frame, a new reference frame is taken.

Figure 10:
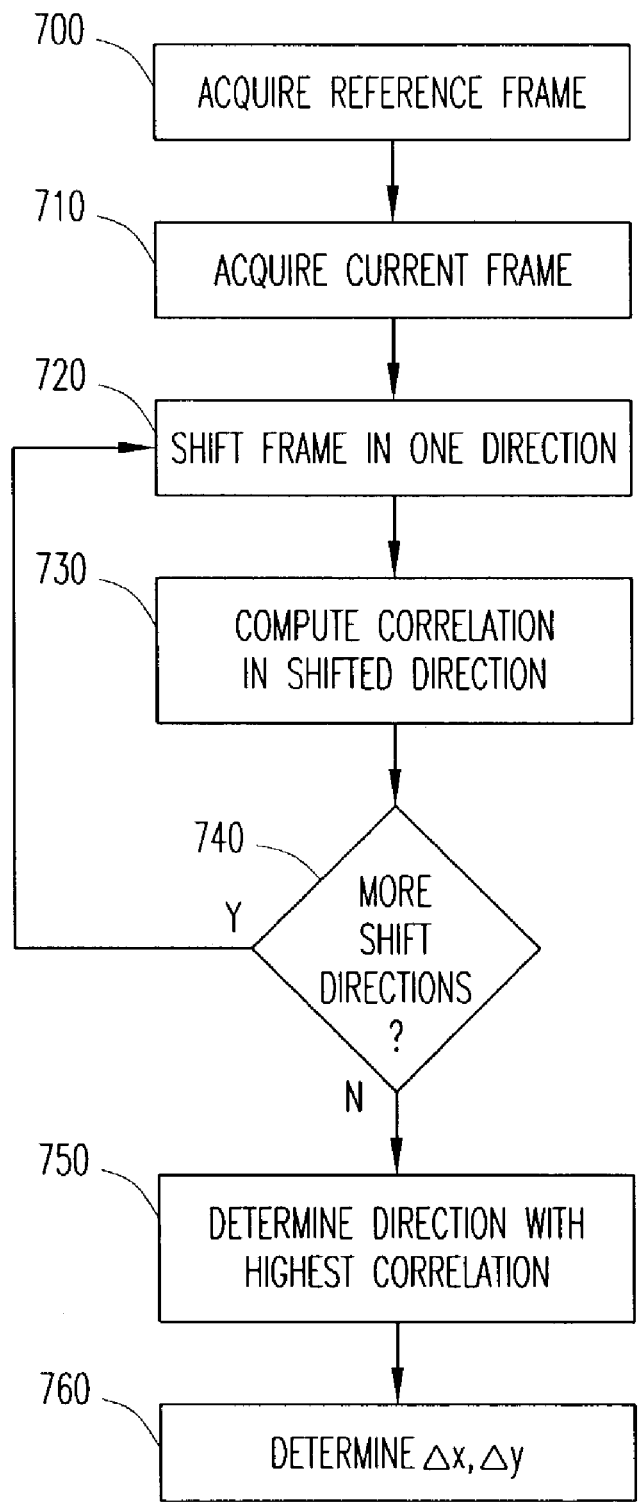
FIG. 10 is a flow chart illustrating an exemplary process for operating in finger navigation mode.
Figure 11:
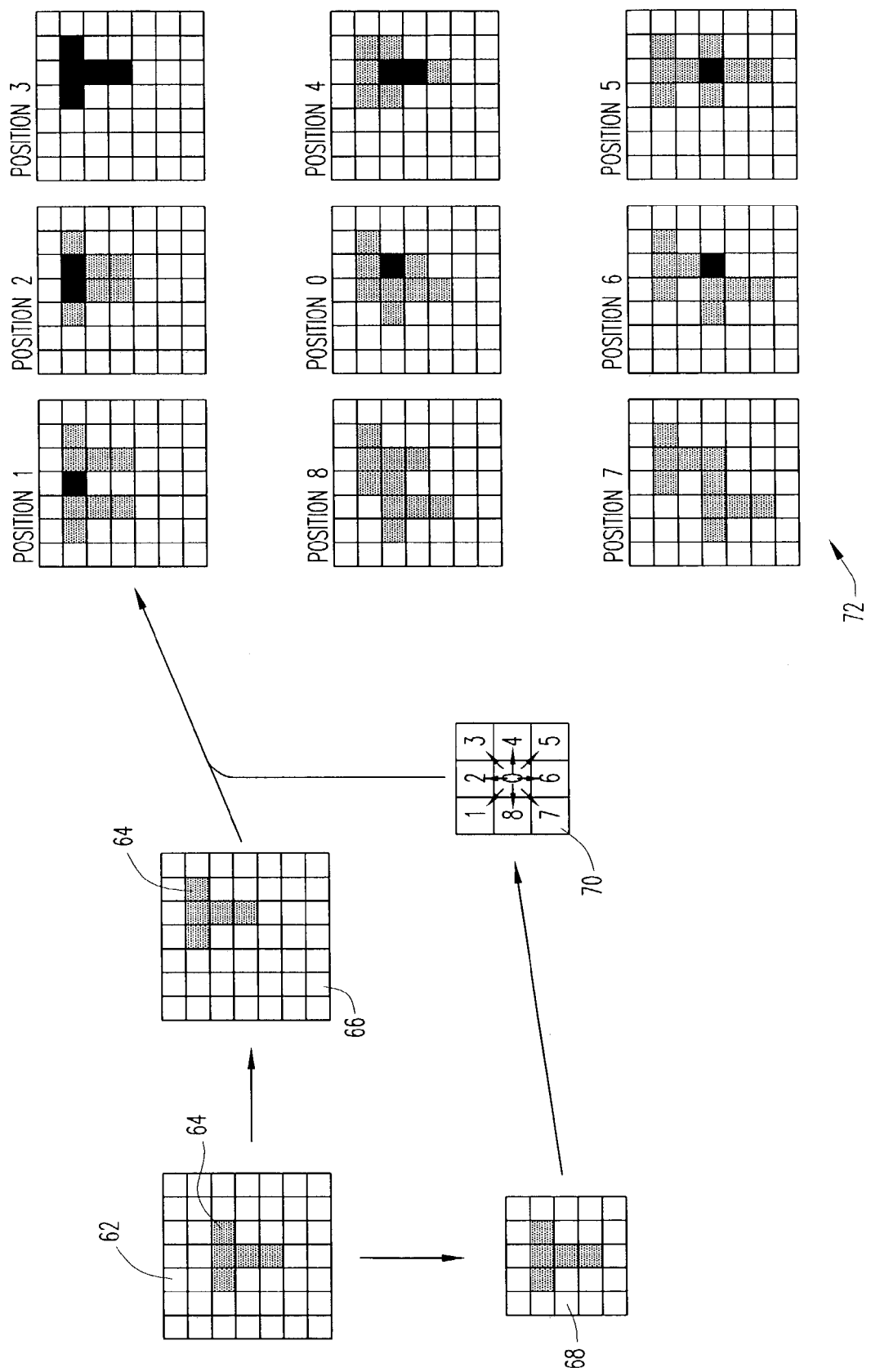
FIG. 11 is a schematic view of selected steps of FIG. 10.

FIG. 11 is a schematic view of selected steps of FIG. 10. A reference frame 62 is shown having an image of a T-shaped feature 64. At a later time (dt), the imaging sensor acquires a current frame 66 which is displaced with respect to the reference frame 62, but which includes substantially the same features. The duration dt is preferably set such that the relative displacement of the T-shaped feature 64 is less than one pixel of the imaging sensor. However, for simplicity purposes, a full-pixel shift is assumed in FIG. 11.

Element 70 in FIG. 11 represents a sequential shifting of the pixel values of frame 68 into the eight nearest-neighbor pixels. That is, step "0" does not include a shift, step "1" is a diagonal shift upward and to the left, step "2" is an upward shift, etc. In this manner, the pixel-shifted frames can be combined with the sample frame to produce the array 72 of position frames. The position frame designated as position "0" does not include a shift, so that the result is merely a combination of frames 66 and 68. Position "3" has the minimum number of shaded pixels, and therefore is the frame with the highest correlation. Based upon the correlation results, the position of the T-shaped feature 64 in the sample frame 66 is determined to be a diagonal rightward and upward shift relative to the position of the same feature in the earlier-acquired reference frame 62, which implies the finger has moved leftwardly and downwardly during time dt.

Figure 12:
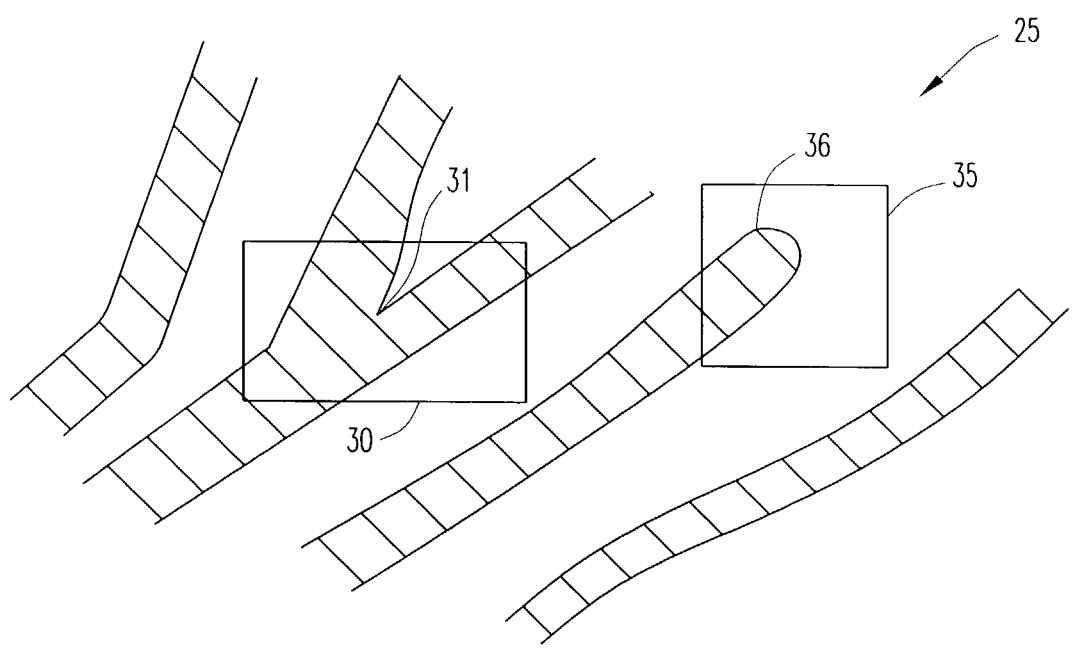
FIG. 12 illustrates a portion of a typical fingerprint.

Although a T-shaped feature is shown in FIG. 11 for simplicity purposes, FIG. 12 illustrates a portion of a typical fingerprint 25 having several micro texture features thereon. A fingerprint 25 of a person has a distinctive and unique ridge pattern structure. For navigation and recognition purposes, a person's ridge pattern structure can be characterized by the position of the ends and bifurcations of the individual ridges. These micro texture features are known in the fingerprinting art as minutiae.

The minutiae for the fingerprint shown in FIG. 12 are enclosed by "boxes." For example, box 30 encloses a bifurcation minutia 31 of a bifurcated ridge and box 35 encloses an end minutia 36. It should be noted that minutiae on the ridges in fingerprints have directions (also called orientations) associated with them. The direction of a minutia at a ridge end is the direction in which the end of the ridge points. The direction of a bifurcation minutia is the direction in which the bifurcated ridge points.

Figure 13:
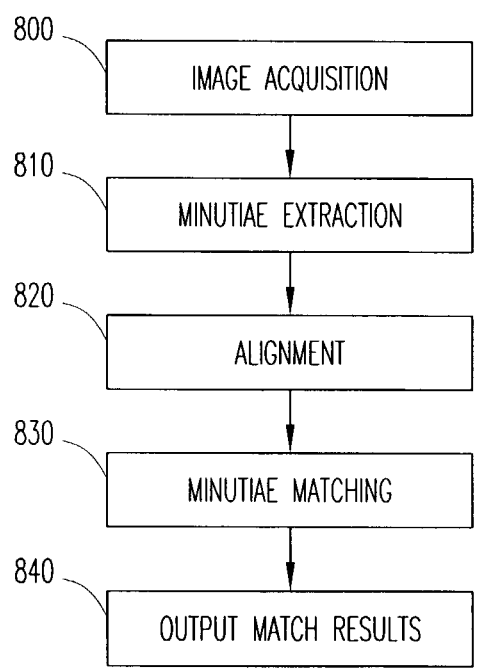
FIG. 13 is a flowchart illustrating an exemplary process for operating in finger recognition mode.

Referring now to FIG. 13, there is illustrated an exemplary process for using the minutiae of a fingerprint for authentication and identification purposes while the imaging system is operating in finger recognition mode. After the complete image of the fingerprint is acquired (block 800) (as will be described below in connection with FIGS. 14 and 15), relevant minutiae are extracted (block 810). Not all of the minutiae extracted are reliable. Therefore, some of the unreliable minutiae are optionally edited or pruned. Thereafter, the resulting reliable minutiae are aligned with a previously stored template image (block 820) using rotation, translation and scaling parameters that can be estimated based on, for example, the Generalized Hough Transform, as described in N. Ratha et al., "A Real-Time Matching System for Large Fingerprint Database," IEEE Transactions on Pattern Analysis and Machine Intelligence, Vol. 18, No. 8, pp. 799–813 (1996).

The aligned minutiae are matched with the minutiae of the template fingerprint features to determine whether the imaged fingerprint and the template fingerprint match (block 830). For example, for each minutia in the aligned imaged fingerprint, a corresponding consistent minutia is searched for in the template fingerprint. The number of minutiae within the aligned imaged fingerprint that match a corresponding consistent feature in the template fingerprint within a predetermined rectangular neighborhood are counted, and a normalized matching score is generated based on the number of matching minutiae. The higher the score, the higher the likelihood that the imaged fingerprint and the template fingerprint are scans of the same finger. The threshold score for determining a match can be set based upon the application, the total size of the sensing area associated with the complete image and the resolution of the sensor. The results of the matching process can be output for use in providing access to the electronic device (block 840).

Figure 14:
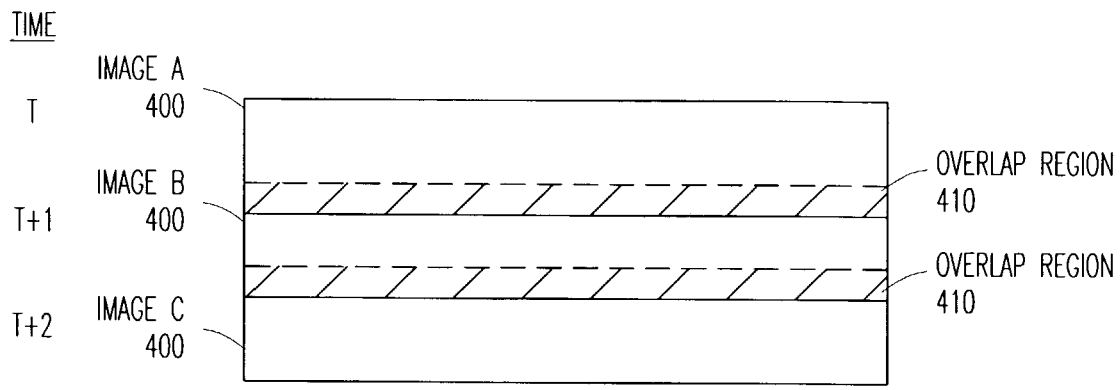
FIG. 14 illustrates successive images having overlap therebetween.

As described above, in order to obtain a complete, continuous image of the fingerprint, successive images taken from the imaging sensor are stitched together. For example, as shown in FIG. 14, a first image 400 (Image A) is taken at time T. At time T+1, a second image 400 (Image B) is taken that has a region 410 overlapping that taken in Image A. At time T+2, a third image 400 (Image C) is taken that has a region 410 overlapping that taken in Image B. In order to form the complete image, each image 400 is stored successively in a memory and those regions 410 that overlap are overwritten from the next image.

Figure 15:
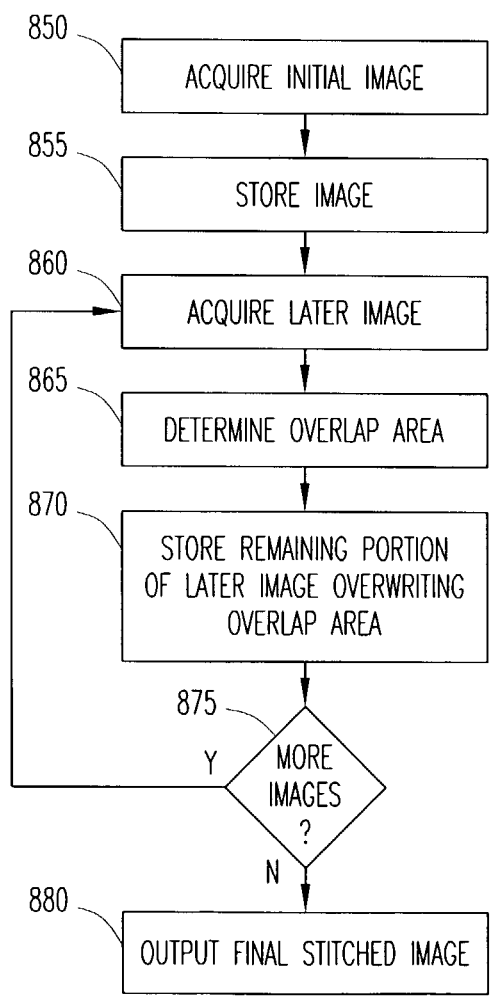
FIG. 15 is a flow chart illustrating an exemplary process for stitching successive images together to form one continuous fingerprint image.

For example, FIG. 15 illustrates an exemplary process for stitching successive images together to form one continuous fingerprint image. An initial image from the portion of the fingerprint pressed against the swipe interface is acquired (block 850) and stored in a buffer (block 855). When a later image is acquired (block 860), a determination is made of the overlap between the initial image and the later image (block 865). The area of overlap can be determined, for example, from the navigation information indicating the direction and amount of movement of the finger between the initial image and the later image.

The portion of the later image that overlaps the initial image is overwritten, and the remaining portion of the later image is stored in the buffer (block 870). The image can be successively output from the buffer to a memory array for storing the continuous fingerprint image. This process is repeated (block 875) for each image taken during the time that the user is swiping his or her finger across the swipe interface. The final stitched fingerprint image is provided to a fingerprint matching application for verification of the user's identity (block 880), as described above in connection with FIG. 13.

As mentioned above, other modes of operation of the imaging system are also possible, depending on the application. One such mode is a stylus mode, in which strokes of the user's finger across the swipe interface are used to indicate characters for display on an electronic device housing at least a portion of the imaging system. Turning now to FIGS. 16A and 16B, exemplary finger strokes and their associated displayed characters are illustrated.

As shown in FIG. 16A, at a first time reference (Time Reference A), the user swipes his or her finger in the x-direction across the width of the swipe interface 110 to complete a first finger stroke 90a. Without lifting his or her finger, at a second time reference (Time Reference B), the user swipes his or her finger in the y-direction along the length of the swipe interface 110 to complete a second finger stroke 90b. The navigation information produced as a result of the combination of the first and second finger strokes 90a and 90b is interpreted by the imaging system to produce the character 520 of letter "L", and as shown in FIG. 16B, the letter "L" is displayed on a display 510 of a cell phone 500 implementing the imaging system.

However, it should be understood that the finger strokes 90a and 90b and associated letter in FIGS. 16A and 16B are shown for illustrative purposes only, and the specific combination of navigation information resulting from the finger strokes 90a and 90b may be interpreted to be any type of character 520, depending on the stylus application. In addition, it should be understood that any number of different finger strokes 90a and 90b can be used to display the associated character(s) 520 on any type of display 510 for any electronic device 500. It should further be understood that the imaging system can be at least partially housed within or connected to the electronic device displaying the character 520.

Referring now to FIG. 17, there is illustrated an exemplary process for using the navigation information to determine the character represented by the finger strokes while the imaging system is operating in stylus mode. When the user's finger is swiped across the swipe interface (block 900), a reference frame is acquired by the imaging system at an initial time (block 910) and a subsequent current frame is acquired at a later time (block 920). The reference frame and current frame are cross-correlated, as described above in connection with FIG. 10, to determine navigation information representing the direction and amount of movement of the finger between the reference frame and current frame (block 930). Successive frames are taken by the imaging system (block 940) and all of the calculated navigation information is used to identify the finger stroke or combination of finger strokes performed by the user that represent a specific character. The reference frame may remain the same during the navigation information collection process, or the reference frame may change with each new current frame or as the reference frame becomes degraded with respect to the position of the current frame. The end of the finger stroke(s) representing a particular character is determined when the user lifts his or her finger out of engagement with the swipe interface, as determined by the outputs of the sensor.

Using the navigation information, the character code identifying the character represented by the finger stroke(s) is determined (block 950) and the character is displayed to the user on a display associated with the electronic device incorporating the swipe module (block 960). For example, the display can be located on the electronic device, such as an LCD of a cell phone. As another example, the display can be located on a screen connected to a personal computer that is connected to a mouse having the swipe module therein.

Figure 18:
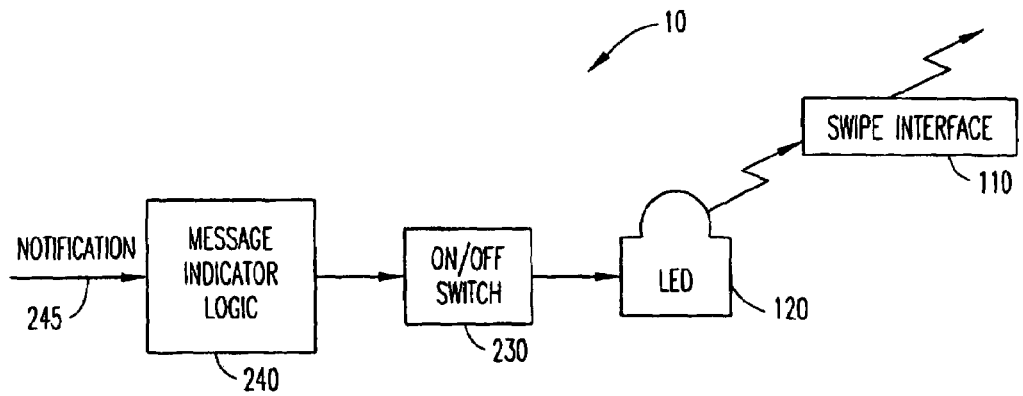
FIG. 18 is a block diagram illustrating the imaging system operating in a blinking mode.

Another mode of operation of the imaging system is shown in FIG. 18, in which the LED 120 is used as a message indicator light while the imaging system 10 is in a blinking mode. For example, if the imaging system 10 is at least partially implemented in an electronic device capable of receiving messages, such as voice mail messages, e-mail message, short message service (SMS) messages or other types of messages, the LED 120 included within the swipe module (shown in FIG. 1) of the imaging system 10 can emit light at repeated intervals to inform the user that a message has been received.

As shown in FIG. 18, message indicator logic 240 included within the electronic device, such as a personal computer, laptop computer, cell phone or PDA, receives notification 245 that a message has been received and instructs an on/off switch 230 connected to the LED 120 to turn the LED 120 on and off in a sequential manner to provide a blinking light emitted from the LED 120. The on and off conditions can be different LED light intensities or the off condition can be a period of time where no light is emitted from the LED 120. While in blinking mode, no image data is captured by the image sensor. If the user switches to another mode of operation requiring image data, the blinking mode is discontinued to ensure sufficient illumination of the finger.

Figure 19A:
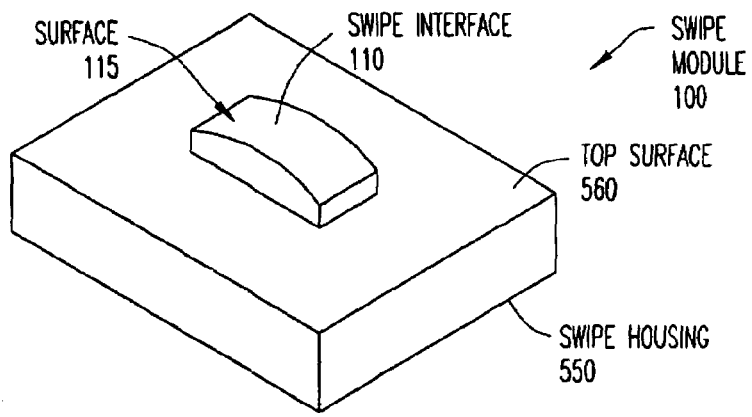
FIGS. 19A and 19B are perspective views of the swipe module package.
Figure 19B:
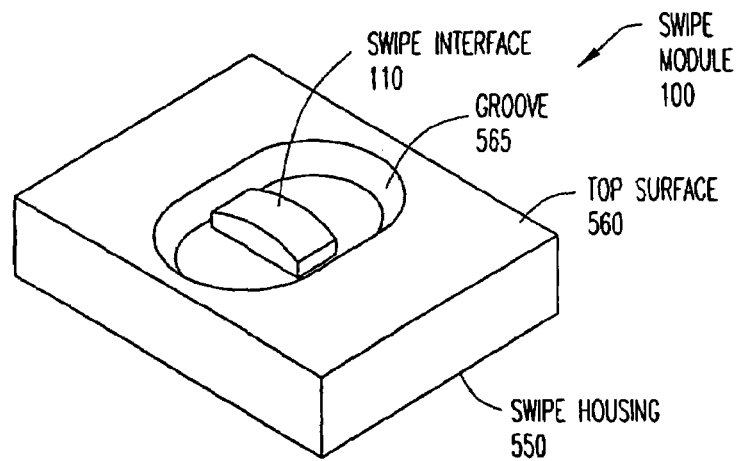

Two examples of package designs for the swipe module 100 are shown in FIGS. 19A and 19B. The swipe module 100 is shown for simplicity as being incorporated within a rectangular housing 550. However, it should be understood that other shapes and designs are possible. In addition, the top surface 560 of the housing 550 may form a part of a surface of an electronic device implementing the swipe module 100. The swipe interface 110 protrudes above the top surface 560 of the housing 550 to provide a swipe surface that is easy for a user to locate and feel. In addition, the swipe interface 110 has a convex surface 115 to enlarge the region of the finger that is in contact with the swipe interface 110.

FIG. 19B further illustrates a mechanically designed groove 565 in the top surface 560 of the housing 550 that directs the finger across the swipe interface in one non-rotating swipe motion. Reducing rotation of the finger during finger navigation and finger recognition reduces processing complexity and may remove the need for additional navigation sensors to detect rotation and other curvilinear movements.

The innovative concepts described in the present application can be modified and varied over a wide range of applications. Accordingly, the scope of patented subject matter should not be limited to any of the specific exemplary teachings discussed, but is instead defined by the following claims.

We claim:

1. An apparatus for imaging a fingerprint in a selected mode of operation, said selected mode of operation being capable of being a finger navigation mode or a finger recognition mode, said apparatus comprising:
   a finger interface having a sensing area on a surface thereof against which a portion of the tip of a human finger is placed, said sensing area containing two or more partitions;
   multiple light sources, each being associated with one of said two or more partitions, said multiple light sources being capable of sequentially emitting light to illuminate the portion of the tip of the human finger within said respective one of said two or more partitions; and
   a sensor for receiving as a partition image light reflected from the portion of the tip of the human finger in a selected one of said two or more partitions illuminated by one of said light sources and for producing image data corresponding to said partition image, said selected partition being selected based at least in part upon said selected mode of operation.

2. The apparatus of claim 1, further comprising:
   respective image transfer optics for each of said two or more partitions, each said image transfer optics for transferring light reflected from the portion of the tip of the human finger within said respective one of said two or more partitions to said sensor.

3. The apparatus of claim 2, wherein each said image transfer optics has a magnification less than unity.

4. The apparatus of claim 2, further comprising:
   respective illumination optics for each of said light sources, each said illumination optics for directing the light from said respective one of said light sources towards the surface of said interface within said respective one of said two or more partitions.

5. The apparatus of claim 1, wherein each of said light sources has an on condition and an off condition associated therewith, and one of said light sources associated with said selected partition is operating in the on condition and the rest of said light sources are operating in the off condition in finger navigation mode.

6. The apparatus of claim 1, wherein each of said light sources has an on condition and an off condition associated therewith, and wherein said light sources are capable of operating in a sequential manner between the on condition and the off condition to sequentially capture the image within sequentially selected ones of said two or more partitions in finger recognition mode.

7. The apparatus of claim 1, wherein said finger interface is a swipe interface having an elongated sensing area, said elongated sensing area being smaller in area than the tip of the human finger in at least one dimension.

8. The apparatus of claim 1, wherein said finger interface is an area interface having a sensing area that is greater than or equal to the area of the tip of the human finger.

9. An imaging system for operating in a selected mode, said selected mode being capable of being a finger navigation mode or a finger recognition mode, said imaging system comprising:
- multiple light sources, each associated with one of two or more partitions of a sensing area against which a portion of the tip of a human finger is placed, said multiple light sources being capable of sequentially emitting light to illuminate the portion of the tip of the human finger within said respective one of said two or more partitions; and
- a sensor for receiving as a partition image light reflected from the portion of the tip of the human finger in a selected one of said two or more partitions illuminated by one of said light sources and for producing image data corresponding to said partition image;
- a processor connected to receive said image data and process said image data in said selected mode; and
- a mode switch connected to said processor to select said selected mode and to select said selected partition based on said selected mode.

10. The imaging system of claim 9, further comprising:
image timing control circuitry connected to said mode switch and said sensor to control the frame rate and exposure time of said sensor based on said selected mode.

11. The imaging system of claim 9, further comprising:
a switch connected to said light sources for turning on one of said light sources associated with said selected partition and turning off the rest of said light sources in finger navigation mode.

12. The imaging system of claim 9, further comprising:
a switch connected to each of said light sources and said mode switch for sequentially turning each of said light sources associated with sequentially selected ones of said two or more partitions in finger recognition mode.

13. The imaging system of claim 9, wherein said selected mode of operation is a stylus mode, said processor further for determining one or more finger strokes associated with the motion of the human finger across the sensing area to identify a character associated with the one or more finger strokes.

14. A method for operating an imaging system in a selected mode, said selected mode being capable of being a finger navigation mode or a finger recognition mode, said method comprising:
- illuminating a portion of the tip of a human finger placed against a sensing area within a selected one of two or more partitions of the sensing area;
- receiving light reflected from the portion of the tip of the human finger within said selected partition as a partition image thereof; and
- producing image data corresponding to said partition image.

15. The method of claim 14, further comprising:
- selecting said selected partition based at least in part on said selected mode; and
- processing said image data in said selected mode.

16. The method of claim 15, further comprising:
controlling the frame rate and exposure time based on said selected mode.

17. The method of claim 14, wherein said illuminating further comprises:
illuminating said selected partition and not illuminating the rest of said two or more partitions in finger navigation mode.

18. The method of claim 14, wherein said illuminating further comprises:
sequentially illuminating sequentially selected ones of said two or more partitions in finger recognition mode.

* * * * *